US012650654B2

(12) United States Patent
Narita et al.

(10) Patent No.: US 12,650,654 B2
(45) **Date of Patent: *Jun. 9, 2026**

(54) IMAGE FORMING UNIT AND IMAGE FORMING APPARATUS

(71) Applicant: FUJIFILM Business Innovation Corp., Tokyo (JP)

(72) Inventors: Kosuke Narita, Kanagawa (JP); Tomoya Sasaki, Kanagawa (JP); Ryosuke Fujii, Kanagawa (JP); Kohei Hashimoto, Kanagawa (JP); Hiroko Kobayashi, Kanagawa (JP); Yuto Okazaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 614 days.

This patent is subject to a terminal disclaimer.

(21) Appl. No.: 18/171,369

(22) Filed: Feb. 19, 2023

(65) Prior Publication Data

US 2023/0266684 A1 Aug. 24, 2023

(30) Foreign Application Priority Data

Feb. 21, 2022 (JP) ................................ 2022-024958

(51) Int. Cl.
*G03G 15/00* (2006.01)
*G03G 5/05* (2006.01)
(Continued)

(52) U.S. Cl.
CPC ........... *G03G 5/056* (2013.01); *G03G 5/0564* (2013.01); *G03G 5/061443* (2020.05);
(Continued)

(58) Field of Classification Search
CPC ............... G03G 5/056; G03G 5/06147; G03G 5/061443; G03G 5/0564; G03G 3/144; G03G 15/0233; G03G 15/75
See application file for complete search history.

(56) References Cited

U.S. PATENT DOCUMENTS

| | | | |
|---|---|---|---|
| 10,539,888 B2 | 1/2020 | Kaku et al. |
| 10,545,453 B2 | 1/2020 | Iwasaki et al. |

(Continued)

FOREIGN PATENT DOCUMENTS

| | | |
|---|---|---|
| JP | H11249384 | 9/1999 |
| JP | 2002235730 | 8/2002 |

(Continued)

OTHER PUBLICATIONS

JP-2008203802-A Translation (Year: 2025).*

(Continued)

*Primary Examiner* — Mark F. Huff
*Assistant Examiner* — Charles Collins Sullivan, IV
(74) *Attorney, Agent, or Firm* — JCIPRNET

(57) ABSTRACT

An image forming unit includes a photoreceptor and a charging member that comes into contact with a surface of the photoreceptor and charges the photoreceptor, in which the photoreceptor includes a conductive substrate, and a lamination type photosensitive layer disposed on the conductive substrate and including a charge generation layer and a charge transport layer, the charge transport layer contains at least one of a polyester resin that has a constitutional unit having an aromatic ring or a polycarbonate resin that has a constitutional unit having an aromatic ring, the charging member includes a support member and an elastic layer disposed on the support member, and the elastic layer has a storage elastic modulus G' of 5.0 MPa or less at (Continued)

a frequency of 100 Hz in dynamic viscoelasticity measurement under a temperature condition of 24° C.

20 Claims, 4 Drawing Sheets

(51) Int. Cl.

| | |
|---|---|
| ***G03G 5/06*** | (2006.01) |
| ***G03G 5/14*** | (2006.01) |
| ***G03G 15/02*** | (2006.01) |

(52) U.S. Cl.

CPC ......... *G03G 5/06147* (2020.05); *G03G 5/144* (2013.01); *G03G 15/0233* (2013.01); *G03G 15/75* (2013.01)

(56) References Cited

U.S. PATENT DOCUMENTS

| | | | | |
|---|---|---|---|---|
| 11,106,147 | B2 | 8/2021 | Kudoh | |
| 11,644,762 | B2 * | 5/2023 | Kinuta | G03G 21/1814 399/111 |
| 2015/0044379 | A1 * | 2/2015 | Iida | G03G 15/1685 427/377 |
| 2020/0233322 | A1 | 7/2020 | Choda et al. | |
| 2021/0286277 | A1 | 9/2021 | Shimizu | |

FOREIGN PATENT DOCUMENTS

| | | | |
|---|---|---|---|
| JP | 2006154565 | | 6/2006 |
| JP | 2008203802 | A * | 9/2008 |
| JP | 2009058789 | | 3/2009 |
| JP | 2013097300 | | 5/2013 |
| JP | 2015184580 | | 10/2015 |
| JP | 2017062435 | | 3/2017 |
| JP | 2018159087 | | 10/2018 |
| JP | 2019012141 | | 1/2019 |
| JP | 2019035900 | | 3/2019 |
| JP | 2019061152 | | 4/2019 |
| JP | 2019095674 | | 6/2019 |
| JP | 2019095678 | | 6/2019 |
| JP | 2019095784 | | 6/2019 |
| JP | 2021015223 | | 2/2021 |
| JP | 2021071565 | | 5/2021 |
| JP | 2021117377 | | 8/2021 |
| JP | 2021148818 | | 9/2021 |
| WO | 2019070003 | | 4/2019 |

OTHER PUBLICATIONS

"Notice of Reasons for Refusal of Japan Counterpart Application", issued on Nov. 25, 2025, with English translation thereof, p. 1-p. 5.

* cited by examiner

IMAGE FORMING UNIT AND IMAGE FORMING APPARATUS

CROSS-REFERENCE TO RELATED APPLICATIONS

This application is based on and claims priority under 35 USC 119 from Japanese Patent Application No. 2022-024958 filed Feb. 21, 2022.

BACKGROUND

(i) Technical Field

The present disclosure provides an image forming unit and an image forming apparatus.

(ii) Related Art

JP2019-95784A discloses a process cartridge including a photoreceptor that has a surface layer containing a resin and a charge transport material, and a charging member that charges the photoreceptor, in which an average value of a Martens hardness of the surface layer of the photoreceptor is 245 $N/mm^2$ or greater, an average value of a Martens hardness of a surface of the charging member at a core portion is 2 $N/mm^2$ or greater and 20 $N/mm^2$ or less, and an average value of viscosity is 70 mV or less.

JP2019-95674A discloses a process cartridge including a charging member, and a photoreceptor that is contact-charged by the charging member, in which a surface layer of the charging member contains insulating hollow particles and a binder, the hollow particles form projections exposed to the surface of the surface layer, an average thickness of shells of the hollow particles is 0.05 μm or greater and 3.00 μm or less, an average diameter of hollow portions of the hollow particles is 7 μm or greater and 100 μm or less, and the surface layer of the photoreceptor contains a charge transport material, a polycarbonate resin having an aromatic ring, and a polyester resin having an aromatic ring.

SUMMARY

Aspects of non-limiting embodiments of the present disclosure relate to an image forming unit that suppresses abrasion of a photoreceptor as compared with an image forming unit including a charging member that includes an elastic layer having a storage elastic modulus G' of greater than 5.0 MPa at a frequency of 100 Hz in dynamic viscoelasticity measurement under a temperature condition of 24° C.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspect.

According to an aspect of the present disclosure, there is provided an image forming unit including a photoreceptor, and a charging member that comes into contact with a surface of the photoreceptor and charges the photoreceptor, in which the photoreceptor includes a conductive substrate, and a lamination type photosensitive layer disposed on the conductive substrate and including a charge generation layer and a charge transport layer, the charge transport layer contains at least one of a polyester resin that has a constitutional unit having an aromatic ring or a polycarbonate resin that has a constitutional unit having an aromatic ring, the charging member includes a support member and an elastic layer disposed on the support member, and the elastic layer has a storage elastic modulus G' of 5.0 MPa or less at a frequency of 100 Hz in dynamic viscoelasticity measurement under a temperature condition of 24° C.

BRIEF DESCRIPTION OF THE DRAWINGS

Exemplary embodiment(s) of the present invention will be described in detail based on the following figures, wherein.

DETAILED DESCRIPTION

Figure 1:
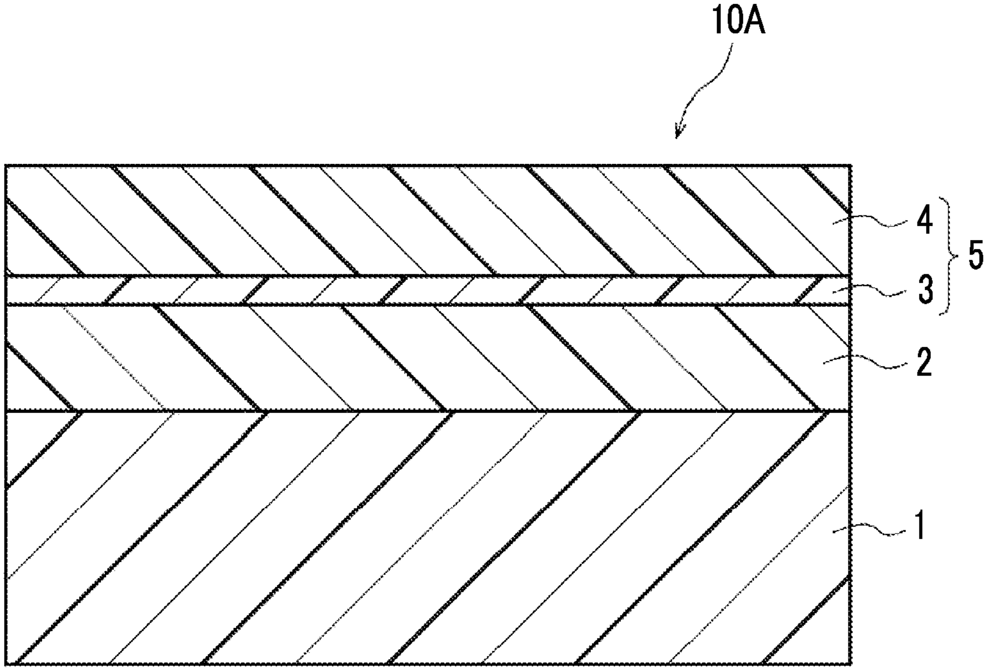
FIG. 1 is a partial cross-sectional view showing an example of a layer configuration of a photoreceptor of an image forming unit according to a first exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, an alkyl group is any of linear, branched, or cyclic unless otherwise specified.

In the present disclosure, a hydrogen atom in an organic group, an aromatic ring, a linking group, an alkyl group, an aryl group, an aralkyl group, an alkoxy group, or an aryloxy group may be substituted with a halogen atom.

Image Forming Unit

An image forming unit according to the present exemplary embodiment includes a photoreceptor and a charging member (so-called contact type charging member) that comes into contact with a surface of the photoreceptor and charges the photoreceptor. The charging member includes a support member and an elastic layer disposed on the support member. The elastic layer has a storage elastic modulus G' of 5.0 MPa or less at a frequency of 100 Hz in dynamic viscoelasticity measurement under a temperature condition of 24° C.

The image forming unit according to the present exemplary embodiment includes an image forming unit of a first exemplary embodiment and an image forming unit of a second exemplary embodiment.

In the image forming unit according to the first exemplary embodiment, the photoreceptor includes a conductive substrate, and a lamination type photosensitive layer disposed on the conductive substrate and including a charge generation layer and a charge transport layer.

The charge transport layer of the photoreceptor according to the first exemplary embodiment contains at least one of a polyester resin that has a constitutional unit having an aromatic ring or a polycarbonate resin that has a constitutional unit having an aromatic ring.

The photoreceptor according to the first exemplary embodiment may further include other layers (for example, an undercoat layer and an interlayer) in addition to the lamination type photosensitive layer. In the photoreceptor according to the first exemplary embodiment, for example, it is preferable that the charge transport layer is a surface layer.

In the image forming unit according to the second exemplary embodiment, the photoreceptor includes a conductive substrate, and a single layer type photosensitive layer disposed on the conductive substrate.

The single layer type photosensitive layer of the photoreceptor according to the second exemplary embodiment contains at least one of a polyester resin that has a constitutional unit having an aromatic ring or a polycarbonate resin that has a constitutional unit having an aromatic ring.

The photoreceptor according to the second exemplary embodiment may further include other layers (for example, an undercoat layer and an interlayer) in addition to the single layer type photosensitive layer. In the photoreceptor according to the second exemplary embodiment, for example, it is preferable that the single layer type photosensitive layer is a surface layer.

FIG. 1 is a partial cross-sectional view schematically showing an example of the layer configuration of the photoreceptor according to the first exemplary embodiment. A photoreceptor 10A shown in FIG. 1 includes a lamination type photosensitive layer. The photoreceptor 10A has a structure in which an undercoat layer 2, a charge generation layer 3, and a charge transport layer 4 are laminated in this order on a conductive substrate 1, and the charge generation layer 3 and the charge transport layer 4 constitute a photosensitive layer 5 (so-called function separation type photosensitive layer). The photoreceptor 10A may include an interlayer (not shown) between the undercoat layer 2 and the charge generation layer 3.

Figure 2:
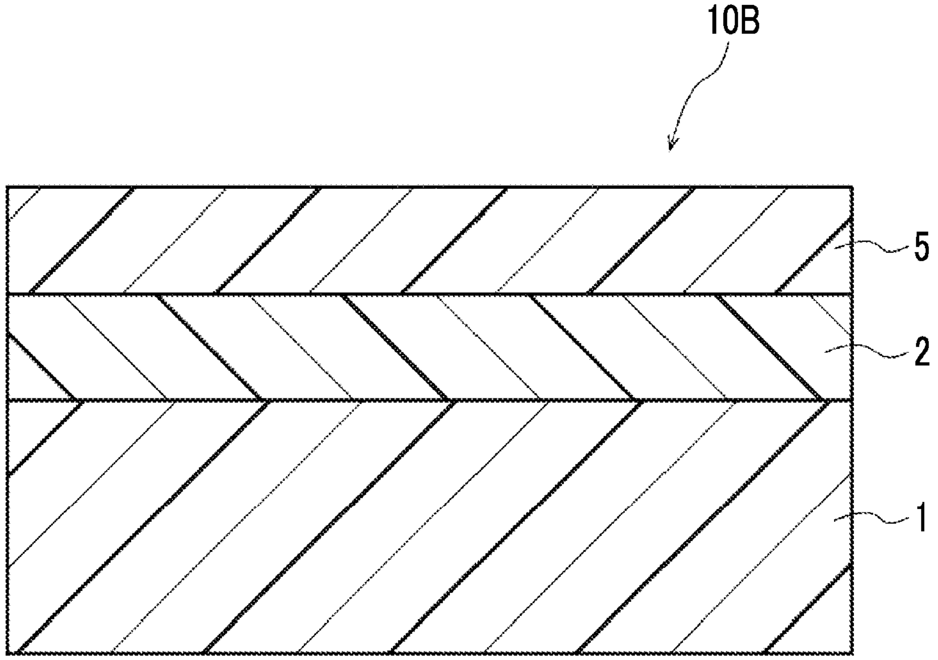
FIG. 2 is a partial cross-sectional view showing an example of a layer configuration of a photoreceptor of an image forming unit according to a second exemplary embodiment.

FIG. 2 is a partial cross-sectional view schematically showing an example of the layer configuration of the photoreceptor according to the second exemplary embodiment. A photoreceptor 10B shown in FIG. 2 includes a single layer type photosensitive layer. The photoreceptor 10B has a structure in which the undercoat layer 2 and the photosensitive layer 5 are laminated in this order on the conductive substrate 1. The photoreceptor 10B may include an interlayer (not shown) between the undercoat layer 2 and the photosensitive layer 5.

Hereinafter, in a case of description common to the first exemplary embodiment and the second exemplary embodiment, both exemplary embodiments are collectively referred to as the present exemplary embodiment. In a case where items common to the charge transport layer and the single layer type photosensitive layer are described, both layers are collectively referred to as a photosensitive layer. Unless otherwise specified, the value of the storage elastic modulus G' is the value of the storage elastic modulus G' at a frequency of 100 Hz measured under a temperature condition of 24° C.

In the image forming unit according to the present exemplary embodiment, excessive abrasion of the photoreceptor is suppressed. The mechanism is assumed as follows.

In a case where a polyester resin or a polycarbonate resin that has a constitutional unit having an aromatic ring is used as a binder resin for the photosensitive layer, since the dielectric properties of the resins are high, the amount of discharge from the charging member required for charging the photosensitive layer is small.

Meanwhile, since the storage elastic modulus G' of the elastic layer of the charging member is 5.0 MPa or less, the elastic layer is likely to be deformed in a case where the charging member comes into contact with the photoreceptor.

Local discharge in a large amount between the photoreceptor and the charging member is unlikely to occur in a case where the photoreceptor and the charging member having the above-described properties are used in combination, and thus deterioration of the surface of the photoreceptor is suppressed. As a result, excessive abrasion of the photoreceptor due to a cleaning blade or a intermediate transfer member is suppressed.

From the viewpoint of suppressing abrasion of the photoreceptor, the storage elastic modulus G' of the elastic layer of the charging member of the image forming unit according to the present exemplary embodiment is 5.0 MPa or less, for example, preferably 4.0 MPa or less, and more preferably 3.5 MPa or less.

From the viewpoint of improving contamination resistance of the charging member, the storage elastic modulus G' of the elastic layer of the charging member of the image forming unit according to the present exemplary embodiment is, for example, preferably 1.0 MPa or greater, more preferably 1.2 MPa or greater, and still more preferably 1.5 MPa or greater.

In the present exemplary embodiment, the method of measuring the storage elastic modulus G' of the elastic layer of the charging member is as follows.

An elastic layer that is a material for producing the charging member is prepared or an elastic layer is peeled off from the charging member to prepare an elastic layer. The elastic layer is cut into a length of 24 mm, a width of 2 mm, and a thickness of 0.5 mm, and this cut piece is used as a test piece. The long side of the test piece is aligned with the axial direction of the charging member. The number of places for which the test pieces are prepared is a total of 10 places which are 5 places of the charging member in the axial direction at equal intervals (that is, evenly from the vicinity of one end to the vicinity of the other end) and two places of the charging member in the rotation direction at equal intervals.

The storage elastic modulus G' is measured under conditions of a measurement environment temperature of 24° C., a distance between chucks of 20 mm, a load of 10 gf, an amplitude of 80 μm, and automatic sweep at a frequency of 0.1 Hz to 100 Hz using a dynamic viscoelasticity measuring device (RHEOVIBRON, manufactured by Orientech Co., Ltd.). Further, the storage elastic moduli G' of 10 test pieces at a frequency of 100 Hz are arithmetically averaged.

Hereinafter, each of the polyester resin that has a constitutional unit having an aromatic ring, the polycarbonate resin that has a constitutional unit having an aromatic ring, the photoreceptor, and the charging member will be described in detail.

Polyester Resin that has Constitutional Unit Having Aromatic Ring

As the polyester resin that has a constitutional unit having an aromatic ring, for example, a polyester resin (1) having at least a dicarboxylic acid unit (A) and a diol unit (B) is preferable. The polyester resin (1) may have other dicarboxylic acid units in addition to the dicarboxylic acid unit (A). The polyester resin (1) may have other diol units in addition to the diol unit (B).

The dicarboxylic acid unit (A) is a constitutional unit represented by Formula (A).

Formula (A)

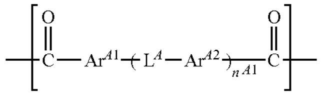

In Formula (A), $Ar^{A1}$ and $Ar^{A2}$ each independently represent an aromatic ring that may have a substituent, $L^A$ represents a single bond or a divalent linking group, and $n^{A1}$ represents 0, 1, or 2.

The aromatic ring as $Ar^{A1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A1}$ may be substituted with an alkyl group, an aryl group, an aralkyl group, an alkoxy group, an aryloxy group, a halogen atom, or the like. As the substituent in a case where the aromatic ring as $Ar^{A1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring of $Ar^{A2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A2}$ may be substituted with an alkyl group, an aryl group, an aralkyl group, an alkoxy group, an aryloxy group, a halogen atom, or the like. As the substituent in a case where the aromatic ring as $Ar^{A2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

In a case where $L^A$ represents a divalent linking group, examples of the divalent linking group include an oxygen atom, a sulfur atom, and —$C(Ra^1)(Ra^2)$—. Here, $Ra^1$ and $Ra^2$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Ra^1$ and $Ra^2$ may be bonded to each other to form a cyclic alkyl group.

The alkyl group having 1 or more and 10 or less carbon atoms as $Ra^1$ and $Ra^2$ may be any of linear, branched, or cyclic. The number of carbon atoms of the alkyl group is, for example, preferably 1 or more and 6 or less, more preferably 1 or more and 4 or less, and still more preferably 1 or 2.

The aryl group having 6 or more and 12 or less carbon atoms as $Ra^1$ and $Ra^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ra^1$ and $Ra^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Ra^1$ and $Ra^2$ may be any of a monocycle or a polycycle. The number of carbon atoms of the aryl group is, for example, preferably 6 or more and 10 or less and more preferably 6.

It is preferable that the dicarboxylic acid unit (A) includes, for example, at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4).

Formula (A1)

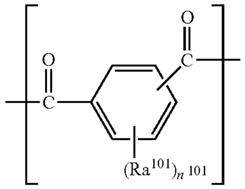

In Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{101}$ represents, for example, preferably 0, 1, or 2, more preferably 0 or 1, and still more preferably 0.

Formula (A2)

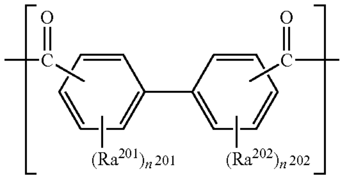

In Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{201}$ represents, for example, preferably 0, 1, or 2, more preferably 0 or 1, and still more preferably 0.

$n^{202}$ represents, for example, preferably 0, 1, or 2, more preferably 0 or 1, and still more preferably 0.

Formula (A3)

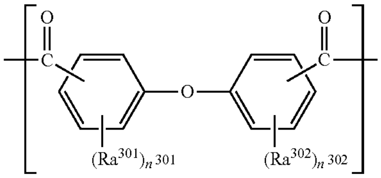

In Formula (A3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{301}$ represents, for example, preferably 0, 1, or 2, more preferably 0 or 1, and still more preferably 0.

$n^{302}$ represents, for example, preferably 0, 1, or 2, more preferably 0 or 1, and still more preferably 0.

Formula (A4)

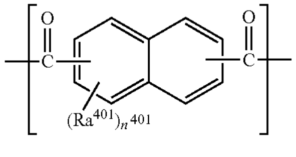

In Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{401}$ represents, for example, preferably an integer of 0 or greater and 4 or less, more preferably 0, 1, or 2, and still more preferably 0.

The specific forms and the preferable forms of $Ra^{101}$ in Formula (A1), $Ra^{201}$ and $Ra^{202}$ in Formula (A2), $Ra^{301}$ and $Ra^{302}$ in Formula (A3), and $Ra^{401}$ in Formula (A4) are the same as each other, and hereinafter, $Ra^{101}$, $Ra^{201}$, $Ra^{202}$, $Ra^{301}$, $Ra^{302}$, and $Ra^{401}$ will be collectively referred to as "Ra".

The alkyl group having 1 or more and 10 or less carbon atoms as Ra may be any of linear, branched, or cyclic. The number of carbon atoms of the alkyl group is, for example, preferably 1 or more and 6 or less, more preferably 1 or more and 4 or less, and still more preferably 1 or 2.

Examples of the linear alkyl group having 1 or more and 10 or less carbon atoms include a methyl group, an ethyl group, an n-propyl group, an n-butyl group, an n-pentyl group, an n-hexyl group, an n-heptyl group, an n-octyl group, an n-nonyl group, and an n-decyl group.

Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic) alkyl groups to which these monocyclic alkyl groups are linked.

The aryl group having 6 or more and 12 or less carbon atoms as Ra may be any of a monocycle or a polycycle. The number of carbon atoms of the aryl group is, for example, preferably 6 or more and 10 or less and more preferably 6.

Examples of the aryl group having 6 or more and 12 or less carbon atoms include a phenyl group, a biphenyl group, a 1-naphthyl group, and a 2-naphthyl group.

The alkyl group in the alkoxy group having 1 or more and 6 or less carbon atoms as Ra may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Hereinafter, dicarboxylic acid units (A1-1) to (A1-9) are shown as specific examples of the dicarboxylic acid unit (A1). The dicarboxylic acid unit (A1) is not limited thereto.

(A1-1)

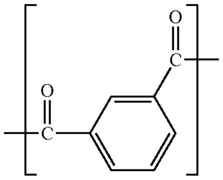

(A1-2)

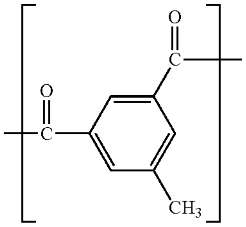

(A1-3)

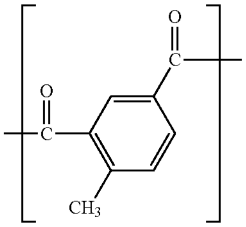

(A1-4)

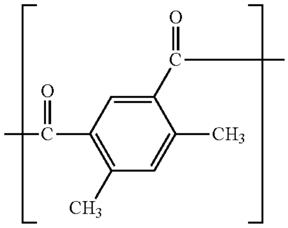

(A1-5)

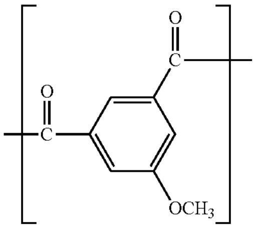

(A1-6)

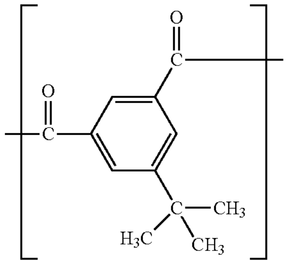

(A1-7)

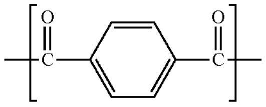

-continued (A1-8)

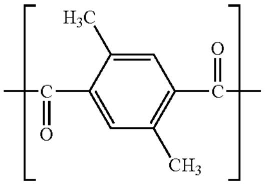

(A1-9)

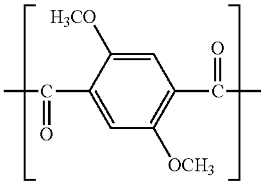

Hereinafter, dicarboxylic acid units (A2-1) to (A2-3) are shown as specific examples of the dicarboxylic acid unit (A2). The dicarboxylic acid unit (A2) is not limited thereto.

(A2-1)

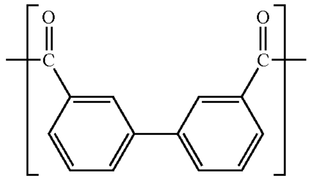

(A2-2)

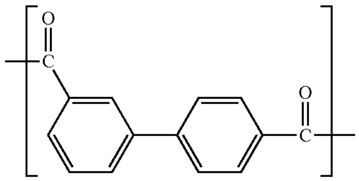

(A2-3)

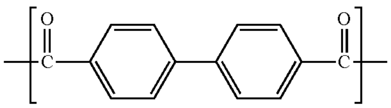

Hereinafter, dicarboxylic acid units (A3-1) and (A3-2) are shown as specific examples of the dicarboxylic acid unit (A3). The dicarboxylic acid unit (A3) is not limited thereto.

(A3-1)

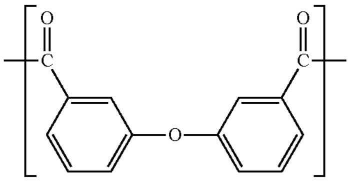

(A3-2)

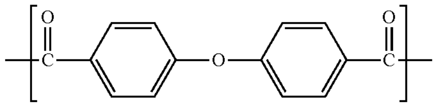

Hereinafter, dicarboxylic acid units (A4-1) to (A4-3) are shown as specific examples of the dicarboxylic acid unit (A4). The dicarboxylic acid unit (A4) is not limited thereto.

(A4-1)

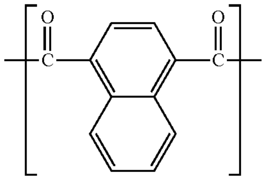

(A4-2)

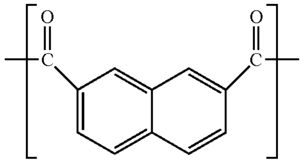

(A4-3)

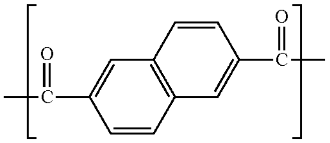

As the dicarboxylic acid unit (A), for example, (A1-1), (A1-7), (A2-3), (A3-2), and (A4-3) in the specific examples shown above are preferable, and (A2-3) is most preferable.

The total mass proportion of the dicarboxylic acid units (A1) to (A4) in the polyester resin (1) is, for example, preferably 15% by mass or greater and 60% by mass or less.

In a case where the total mass proportion of the dicarboxylic acid units (A1) to (A4) is 15% by mass or greater, the abrasion resistance of the photosensitive layer is enhanced. From this viewpoint, the total mass proportion of the dicarboxylic acid units (A1) to (A4) is, for example, more preferably 20% by mass or greater and still more preferably 25% by mass or greater.

In a case where the total mass proportion of the dicarboxylic acid units (A1) to (A4) is 60% by mass or less, peeling of the photosensitive layer can be suppressed. From this viewpoint, the total mass proportion of the dicarboxylic acid units (A1) to (A4) is, for example, more preferably 55% by mass or less and still more preferably 50% by mass or less.

The dicarboxylic acid units (A1) to (A4) contained in the polyester resin (1) may be used alone or in combination of two or more kinds thereof.

Examples of other dicarboxylic acid units (A) in addition to the dicarboxylic acid units (A1) to (A4) include aliphatic dicarboxylic acid (such as oxalic acid, malonic acid, maleic acid, fumaric acid, citraconic acid, itaconic acid, glutaconic acid, succinic acid, alkenyl succinic acid, adipic acid, and sebacic acid) units, alicyclic dicarboxylic acid (such as cyclohexanedicarboxylic acid) units, and lower (for example, having 1 or more and 5 or less carbon atoms) alkyl ester units thereof. These dicarboxylic acid units contained in the polyester resin (1) may be used alone or in combination of two or more kinds thereof.

The dicarboxylic acid unit (A) contained in the polyester resin (1) may be used alone or in combination of two or more kinds thereof.

The diol unit (B) is a constitutional unit represented by Formula (B).

Formula (B)

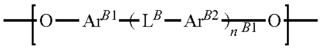

In Formula (B), $Ar^{B1}$ and $Ar^{B2}$ each independently represent an aromatic ring that may have a substituent, $L^B$ represents a single bond, an oxygen atom, a sulfur atom, or $—C(Rb^1)(Rb^2)—$, and $n^{B1}$ represents 0, 1, or 2. $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

The aromatic ring as $Ar^{B1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B1}$ may be substituted with an alkyl group, an aryl group, an aralkyl group, an alkoxy group, an aryloxy group, a halogen atom, or the like. As the substituent in a case where the aromatic ring as $Ar^{B1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring as $Ar^{B2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B2}$ may be substituted with an alkyl group, an aryl group, an aralkyl group, an alkoxy group, an aryloxy group, a halogen atom, or the like. As the substituent in a case where the aromatic ring as $Ar^{B2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The alkyl group having 1 or more and 20 or less carbon atoms as $Rb^1$ and $Rb^2$ may be linear, branched, or cyclic. The number of carbon atoms of the alkyl group is, for example, preferably 1 or more and 18 or less, more preferably 1 or more and 14 or less, and still more preferably 1 or more and 10 or less.

The aryl group having 6 or more and 12 or less carbon atoms as Rb 1 and $Rb^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rb^1$ and $Rb^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rb^1$ and $Rb^2$ may be any of a monocycle or a polycycle. The number of carbon atoms of the aryl group is, for example, preferably 6 or more and 10 or less and more preferably 6.

It is preferable that the diol unit (B) includes, for example, at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

Formula (B1)

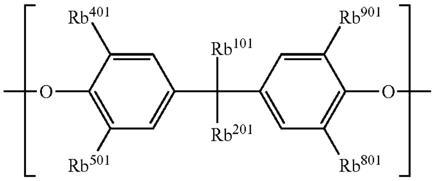

In Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

The number of carbon atoms of the branched alkyl group having 4 or more and 20 or less carbon atoms as $Rb^{101}$ is, for example, preferably 4 or more and 16 or less, more preferably 4 or more and 12 or less, and still more preferably 4 or more and 8 or less. Specific examples of $Rb^{101}$ include an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Formula (B2)

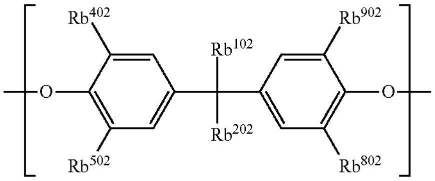

In Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 4 or more and 20 or less carbon atoms as $Rb^{102}$ is, for example, preferably 4 or more and 16 or less, more preferably 4 or more and 12 or less, and still more preferably 4 or more and 8 or less. Specific examples of $Rb^{102}$ include an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Formula (B3)

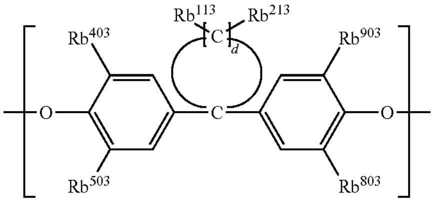

In Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{113}$ and $Rb^{213}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{113}$ and $Rb^{213}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{113}$ and $Rb^{213}$ include a fluorine atom, a chlorine atom, a bromine atom, and an iodine atom.

Formula (B4)

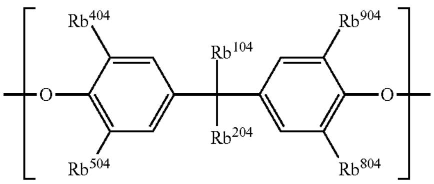

In Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

The alkyl group having 1 or more and 3 or less carbon atoms as $Rb^{104}$ may be any of linear, branched, or cyclic. The number of carbon atoms of the alkyl group is, for example, preferably 1 or 2 and more preferably 1. Specific examples of $Rb^{104}$ include a methyl group, an ethyl group, an n-propyl group, an isopropyl group, and a cyclopropyl group.

Formula (B5)

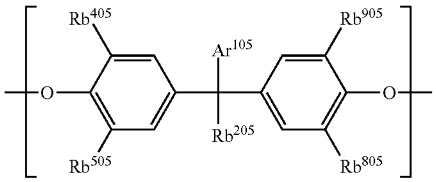

In Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

The aryl group having 6 or more and 12 or less carbon atoms as $Ar^{105}$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ar^{105}$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2. The aryl group in the aralkyl group having 7 or more and 20 or less carbon atoms as $Ar^{105}$ may be any of a monocycle or a polycycle. The number of carbon atoms of the aryl group is, for example, preferably 6 or more and 10 or less and more preferably 6. Examples of the aralkyl group having 7 or more and 20 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

Formula (B6)

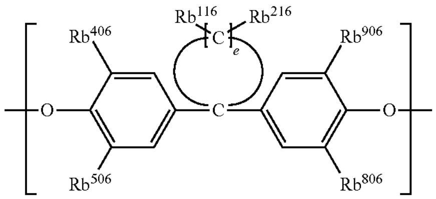

In Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{116}$ and $Rb^{216}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{116}$ and $Rb^{216}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{116}$ and $Rb^{216}$ include a fluorine atom, a chlorine atom, a bromine atom, and an iodine atom.

Formula (B7)

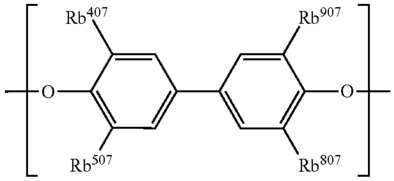

In Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom.

Formula (B8)

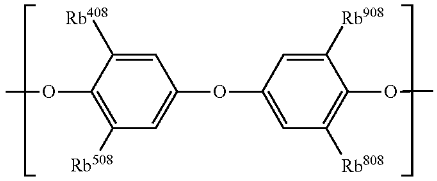

In Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

The specific forms and the preferable forms of $Rb^{201}$ in Formula (B1), $Rb^{202}$ in Formula (B2), $Rb^{204}$ in Formula (B4), and $Rb^{205}$ in Formula (B5) are the same as each other, and hereinafter, $Rb^{201}$, $Rb^{202}$, $Rb^{204}$, and $Rb^{205}$ will be collectively referred to as "$Rb^{200}$".

The alkyl group having 1 or more and 3 or less carbon atoms as $Rb^{200}$ may be any of linear, branched, or cyclic. The number of carbon atoms of the alkyl group is, for example, preferably 1 or 2 and more preferably 1.

The alkyl group having 1 or more and 3 or less carbon atoms includes a methyl group, an ethyl group, an n-propyl group, an isopropyl group, and a cyclopropyl group.

The specific forms and the preferable forms of $Rb^{401}$ in Formula (B1), $Rb^{402}$ in Formula (B2), $Rb^{403}$ in Formula (B3), $Rb^{404}$ in Formula (B4), $Rb^{405}$ in Formula (B5), $Rb^{406}$ in Formula (B6), $Rb^{407}$ in Formula (B7), and $Rb^{408}$ in Formula (B8) are the same as each other, and hereinafter, $Rb^{401}$, $Rb^{402}$, $Rb^{403}$, $Rb^{404}$, $Rb^{405}$, $Rb^{406}$, $Rb^{407}$, and $Rb^{408}$ will be collectively referred to as "$Rb^{400}$".

The alkyl group having 1 or more and 4 or less carbon atoms as $Rb^{400}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{400}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{400}$ include a fluorine atom, a chlorine atom, a bromine atom, and an iodine atom.

The specific forms and the preferable forms of $Rb^{501}$ in Formula (B1), $Rb^{502}$ in Formula (B2), $Rb^{503}$ in Formula (B3), $Rb^{504}$ in Formula (B4), $Rb^{505}$ in Formula (B5), $Rb^{506}$ in Formula (B6), $Rb^{507}$ in Formula (B7), and $Rb^{508}$ in Formula (B8) are the same as each other, and hereinafter, $Rb^{501}$, $Rb^{502}$, $Rb^{503}$, $Rb^{504}$, $Rb^{505}$, $Rb^{506}$, $Rb^{507}$, and $Rb^{508}$ will be collectively referred to as "$Rb^{500}$".

The alkyl group having 1 or more and 4 or less carbon atoms as $Rb^{500}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{500}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{500}$ include a fluorine atom, a chlorine atom, a bromine atom, and an iodine atom.

The specific forms and the preferable forms of $Rb^{801}$ in Formula (B1), $Rb^{802}$ in Formula (B2), $Rb^{803}$ in Formula (B3), $Rb^{804}$ in Formula (B4), $Rb^{805}$ in Formula (B5), $Rb^{806}$ in Formula (B6), $Rb^{807}$ in Formula (B7), and $Rb^{808}$ in Formula (B8) are the same as each other, and hereinafter, $Rb^{801}$, $Rb^{802}$, $Rb^{803}$, $Rb^{804}$, $Rb^{805}$, $Rb^{806}$, $Rb^{807}$, and $Rb^{808}$ will be collectively referred to as "$Rb^{800}$".

The alkyl group having 1 or more and 4 or less carbon atoms as $Rb^{800}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{800}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{800}$ include a fluorine atom, a chlorine atom, a bromine atom, and an iodine atom.

The specific forms and the preferable forms of $Rb^{901}$ in Formula (B1), $Rb^{902}$ in Formula (B2), $Rb^{903}$ in Formula (B3), $Rb^{904}$ in Formula (B4), $Rb^{905}$ in Formula (B5), $Rb^{906}$ in Formula (B6), $Rb^{907}$ in Formula (B7), and $Rb^{908}$ in Formula (B8) are the same as each other, and hereinafter, $Rb^{901}$, $Rb^{902}$, $Rb^{903}$, $Rb^{904}$, $Rb^{905}$, $Rb^{906}$, $Rb^{907}$, and $Rb^{908}$ will be collectively referred to as "$Rb^{900}$".

The alkyl group having 1 or more and 4 or less carbon atoms as $Rb^{900}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{900}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{900}$ include a fluorine atom, a chlorine atom, a bromine atom, and an iodine atom.

Hereinafter, diol units (B1-1) to (B1-6) are shown as specific examples of the diol unit (B1). The diol unit (B1) is not limited thereto.

(B1-1)

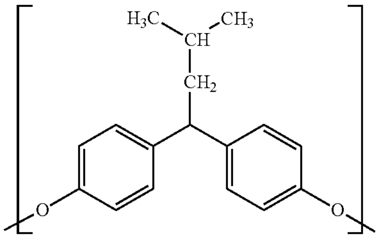

(B1-2)

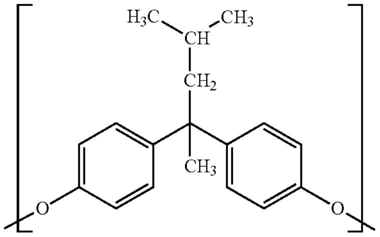

(B1-3)

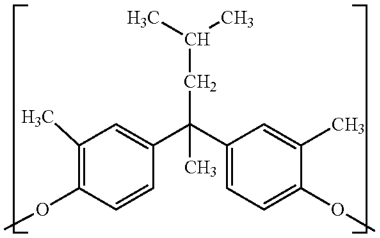

-continued (B1-4)

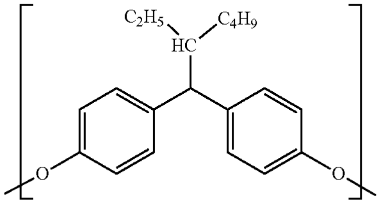

(B1-5)

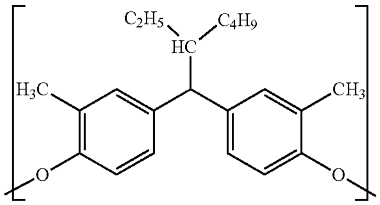

(B1-6)

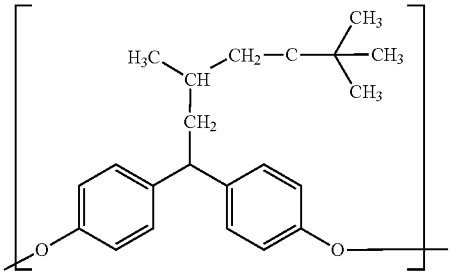

Hereinafter, diol units (B2-1) to (B2-11) are shown as specific examples of the diol unit (B2). The diol unit (B2) is not limited thereto.

(B2-1)

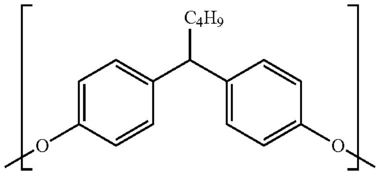

(B2-2)

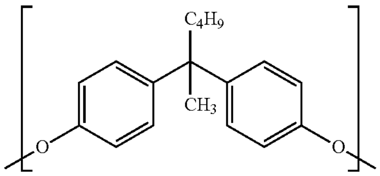

(B2-3)

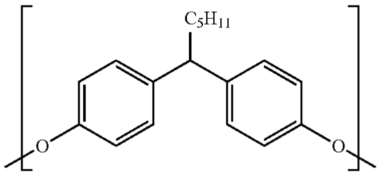

(B2-4)

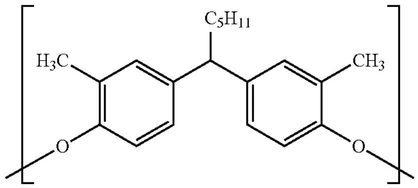

-continued
(B2-5)
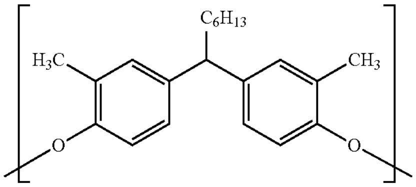
(B2-6)
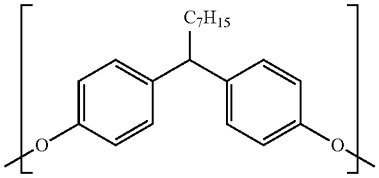
(B2-7)
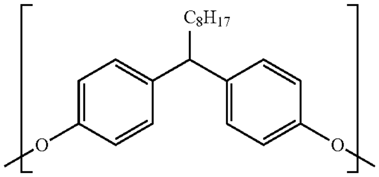
(B2-8)
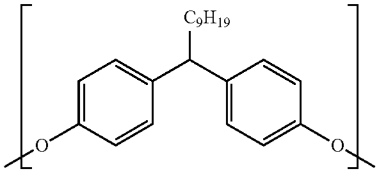
(B2-9)
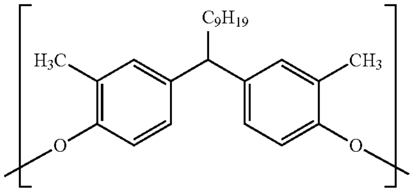
(B2-10)
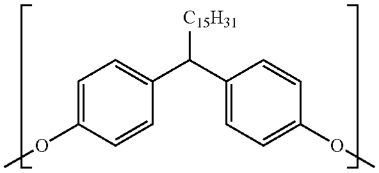
(B2-11)
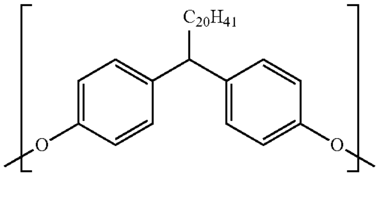
Hereinafter, diol units (B3-1) to (B3-4) are shown as specific examples of the diol unit (B3). The diol unit (B3) is not limited thereto.
(B3-1)
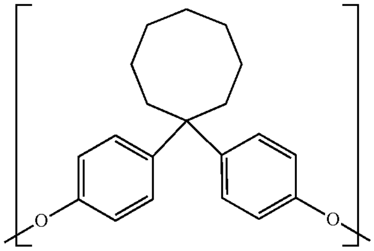
(B3-2)
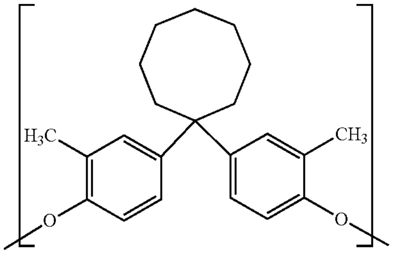
(B3-3)
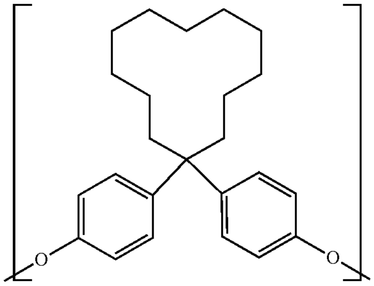
(B3-4)
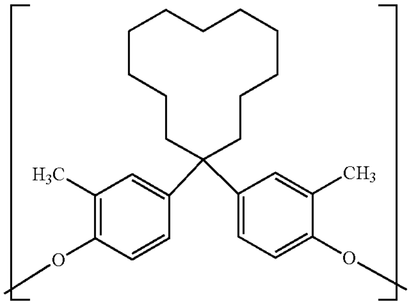
Hereinafter, diol units (B4-1) to (B4-7) are shown as specific examples of the diol unit (B4). The diol unit (B4) is not limited thereto.
(B4-1)
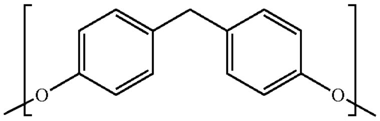
(B4-2)
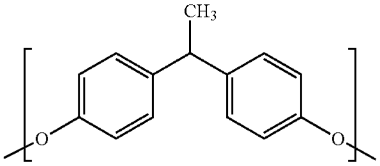

-continued
(B4-3)
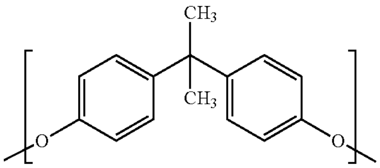
(B4-4)
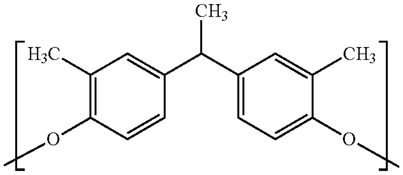
(B4-5)
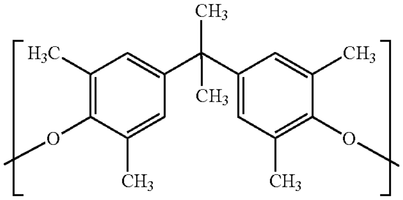
(B4-6)
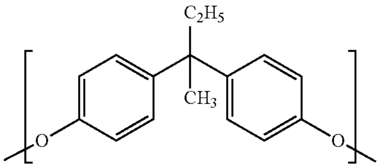
(B4-7)
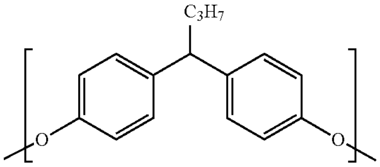
Hereinafter, diol units (B5-1) to (B5-6) are shown as specific examples of the diol unit (B5). The diol unit (B5) is not limited thereto.
(B5-1)
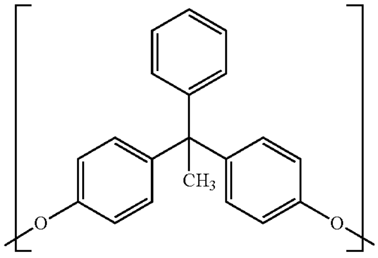
(B5-2)
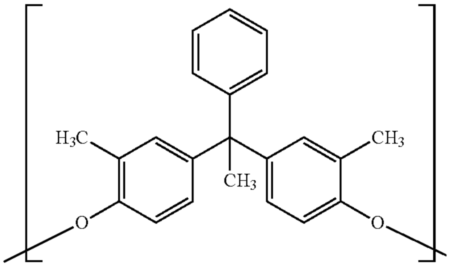
-continued
(B5-3)
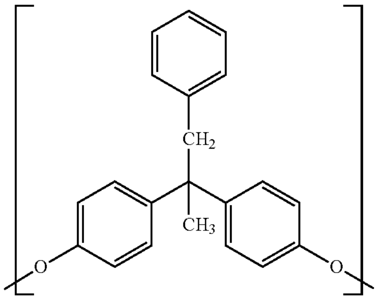
(B5-4)
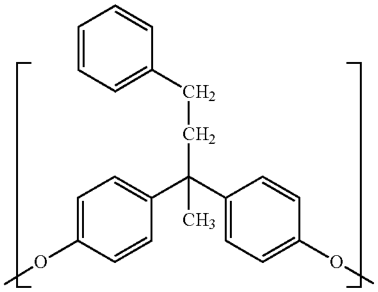
(B5-5)
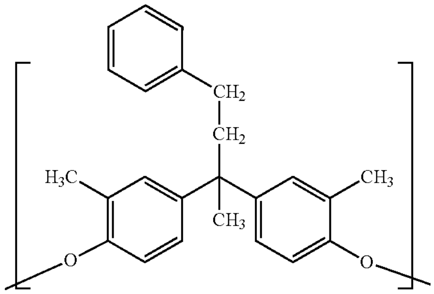
(B5-6)
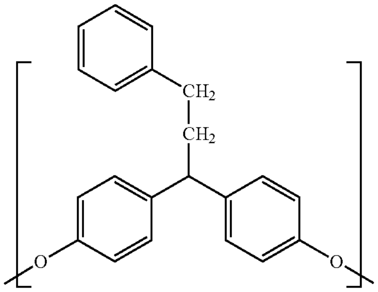
Hereinafter, diol units (B6-1) to (B6-4) are shown as specific examples of the diol unit (B6). The diol unit (B6) is not limited thereto.
(B6-1)
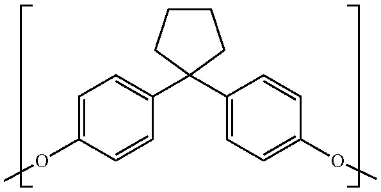

-continued (B6-2)

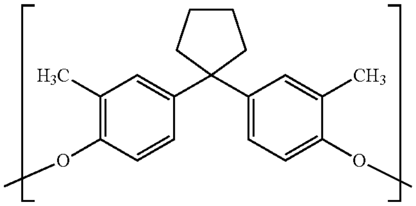

(B6-3)

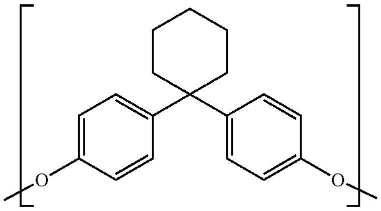

(B6-4)

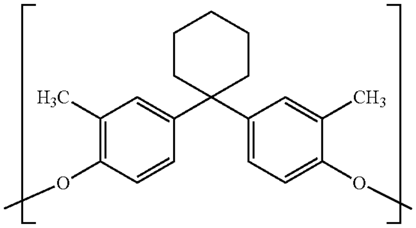

Hereinafter, diol units (B7-1) to (B7-3) are shown as specific examples of the diol unit (B7). The diol unit (B7) is not limited thereto.

(B7-1)

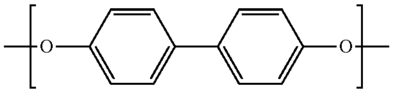

(B7-2)

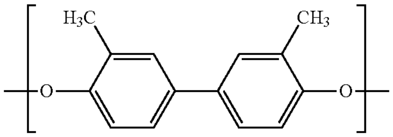

(B7-3)

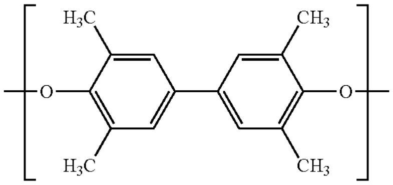

Hereinafter, diol units (B8-1) to (B8-3) are shown as specific examples of the diol unit (B8). The diol unit (B8) is not limited thereto.

(B8-1)

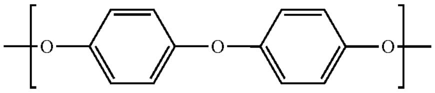

-continued (B8-2)

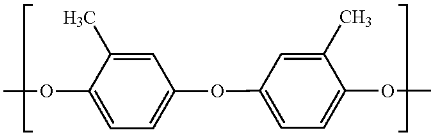

(B8-3)

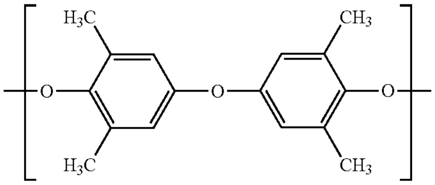

The diol unit (B) contained in the polyester resin (1) may be used alone or in combination of two or more kinds thereof.

The mass proportion of the diol unit (B) in the polyester resin (1) is, for example, preferably 25% by mass or greater and 80% by mass or less.

In a case where the mass proportion of the diol unit (B) is 25% by mass or greater, peeling of the photosensitive layer can be further suppressed. From this viewpoint, the mass proportion of the diol unit (B) is, for example, more preferably 30% by mass or greater and still more preferably 35% by mass or greater.

In a case where the mass proportion of the diol unit (B) is 80% by mass or less, the solubility in a coating solution for forming the photosensitive layer is maintained, and thus the abrasion resistance can be improved. From this viewpoint, the mass proportion of the diol unit (B) is, for example, more preferably 75% by mass or less and still more preferably 70% by mass or less.

Examples of other diol units in addition to the diol unit (B) include aliphatic diol (such as ethylene glycol, diethylene glycol, triethylene glycol, propylene glycol, butanediol, hexanediol, and neopentyl glycol) units and alicyclic diol (such as cyclohexanediol, cyclohexane dimethanol, and hydrogenated bisphenol A) units. These diol units contained in the polyester resin (1) may be used alone or in combination of two or more kinds thereof.

A terminal of the polyester resin (1) may be sealed or modified with a terminal-sealing agent, a molecular weight modifier, or the like used in a case of the production. Examples of the terminal-sealing agent or the molecular weight modifier include monohydric phenol, monovalent acid chloride, monohydric alcohol, and monovalent carboxylic acid.

Examples of the monohydric phenol include phenol, o-cresol, m-cresol, p-cresol, o-ethylphenol, m-ethylphenol, p-ethylphenol, o-propylphenol, m-propylphenol, p-propylphenol, o-tert-butylphenol, m-tert-butylphenol, p-tert-butylphenol, pentylphenol, hexylphenol, octylphenol, nonylphenol, a 2,6-dimethylphenol derivative, a 2-methylphenol derivative, o-phenylphenol, m-phenylphenol, p-phenylphenol, o-methoxyphenol, m-methoxyphenol, p-methoxyphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl)propane, 2-phenyl-2-(2-hydroxyphenyl)propane, and 2-phenyl-2-(3-hydroxyphenyl) propane.

Examples of the monovalent acid chloride include monofunctional acid halides such as benzoyl chloride, benzoic acid chloride, methanesulfonyl chloride, phenylchloroformate, acetic acid chloride, butyric acid chloride, octyl acid chloride, benzenesulfonyl chloride, benzenesulfinyl chloride, sulfinyl chloride, benzene phosphonyl chloride, and substituents thereof.

Examples of the monohydric alcohol include methanol, ethanol, n-propanol, isopropanol, n-butanol, 2-butanol, pentanol, hexanol, dodecyl alcohol, stearyl alcohol, benzyl alcohol, and phenethyl alcohol.

Examples of the monovalent carboxylic acid include acetic acid, propionic acid, octanoic acid, cyclohexanecarboxylic acid, benzoic acid, toluic acid, phenylacetic acid, p-tert-butylbenzoic acid, and p-methoxyphenylacetic acid.

The weight-average molecular weight of the polyester resin (1) is, for example, preferably 30,000 or greater and 300,000 or less, more preferably 40,000 or greater and 250,000 or less, and still more preferably 50,000 or greater and 200,000 or less.

The molecular weight of the polyester resin (1) is a molecular weight measured by gel permeation chromatography (GPC) in terms of polystyrene. The GPC is carried out by using tetrahydrofuran as an eluent.

Examples of the method of producing the polyester resin (1) include an interfacial polymerization method, a solution polymerization method, and a melt polymerization method.

Polycarbonate Resin that has Constitutional Unit Having Aromatic Ring

As the polycarbonate resin that has a constitutional unit having an aromatic ring, for example, a polycarbonate resin (1) having a constitutional unit (C) is preferable.

The constitutional unit (C) is a constitutional unit represented by Formula (C).

Formula (C)

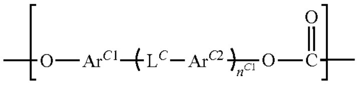

In Formula (C), $Ar^{C1}$ and $Ar^{C2}$ each independently represent an aromatic ring that may have a substituent, $L^C$ represents a single bond or a divalent linking group, and $n^{C1}$ represents 0, 1, or 2.

The aromatic ring as $Ar^{C1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{C1}$ may be substituted with an alkyl group, an aryl group, an aralkyl group, an alkoxy group, an aryloxy group, a halogen atom, or the like. As the substituent in a case where the aromatic ring as $Ar^{C1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring as $Ar^{C2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{C2}$ may be substituted with an alkyl group, an aryl group, an aralkyl group, an alkoxy group, an aryloxy group, a halogen atom, or the like. As the substituent in a case where the aromatic ring as $Ar^{C2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

In a case where $L^C$ represents a divalent linking group, examples of the divalent linking group include an oxygen atom, a sulfur atom, and $-C(Rc^1)(Rc^2)-$. Here, $Rc^1$ and $Rc^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rc^1$ and $Rc^2$ may be bonded to each other to form a cyclic alkyl group.

The alkyl group having 1 or more and 20 or less carbon atoms as $Rc^1$ and $Rc^2$ may be linear, branched, or cyclic. The number of carbon atoms of the alkyl group is, for example, preferably 1 or more and 18 or less, more preferably 1 or more and 14 or less, and still more preferably 1 or more and 10 or less.

The aryl group having 6 or more and 12 or less carbon atoms as $Rc^1$ and $Rc^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rc^1$ and $Rc^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rc^1$ and $Rc^2$ may be any of a monocycle or a polycycle. The number of carbon atoms of the aryl group is, for example, preferably 6 or more and 10 or less and more preferably 6.

It is preferable that the constitutional unit (C) includes, for example, at least one selected from the group consisting of a constitutional unit (Ca1) represented by Formula (Ca1), a constitutional unit (Ca2) represented by Formula (Ca2), a constitutional unit (Ca3) represented by Formula (Ca3), a constitutional unit (Ca4) represented by Formula (Ca4), a constitutional unit (Cb1) represented by Formula (Cb1), a constitutional unit (Cb2) represented by Formula (Cb2), a constitutional unit (Cb3) represented by Formula (Cb3), a constitutional unit (Cb4) represented by Formula (Cb4), a constitutional unit (Cb5) represented by Formula (Cb5), a constitutional unit (Cb6) represented by Formula (Cb6), a constitutional unit (Cb7) represented by Formula (Cb7), and a constitutional unit (Cb8) represented by Formula (Cb8).

Formula (Ca1)

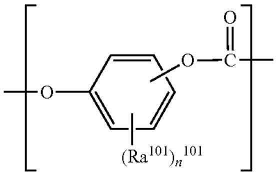

In Formula (Ca1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{101}$ and $n^{101}$ in Formula (Ca1) each have the same definition as that for $Ra^{101}$ and $n^{101}$ in Formula (A1), and the specific forms thereof are also the same as each other.

Formula (Ca2)

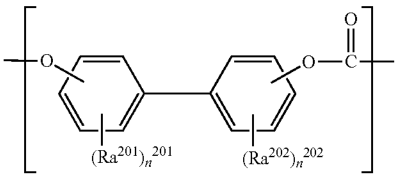

In Formula (Ca2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{201}$, $Ra^{202}$, $n^{201}$, and $n^{202}$ in Formula (Ca2) each have the same definition as that for $Ra^{201}$, $Ra^{202}$, $n^{201}$, and $n^{202}$ in Formula (A2), and the specific forms thereof are also the same as each other.

Formula (Ca3)

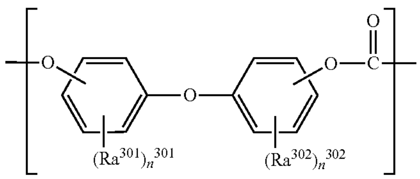

In Formula (Ca3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{301}$, $Ra^{302}$, $n^{301}$, and $n^{302}$ in Formula (Ca3) each have the same definition as that for $Ra^{301}$, $Ra^{302}$, $n^{301}$, and $n^{302}$ in Formula (A3), and the specific forms thereof are also the same as each other.

Formula (Ca4)

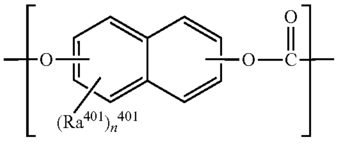

In Formula (Ca4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{401}$ and $n^{401}$ in Formula (Ca4) each have the same definition as that for $Ra^{401}$ and $n^{401}$ in Formula (A4), and the specific forms thereof are also the same as each other.

Formula (Cb1)

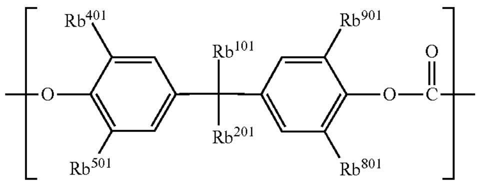

In Formula (Cb1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

$Rb^{101}$, $Rb^{201}$, $Rb^{401}$, $Rb^{501}$, $Rb^{801}$, and $Rb^{901}$ in Formula (Cb1) each have the same definition as that for $Rb^{101}$, $Rb^{201}$, $Rb^{401}$, $Rb^{501}$, $Rb^{801}$, and $Rb^{901}$ in Formula (B1), and the specific forms thereof are also the same as each other.

Formula (Cb2)

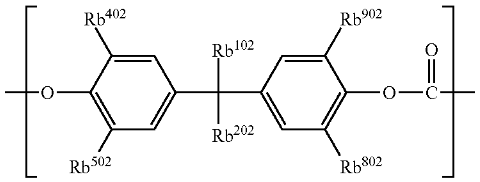

In Formula (Cb2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

$Rb^{102}$, $Rb^{202}$, $Rb^{402}$, $Rb^{502}$, $Rb^{802}$, and $Rb^{902}$ in Formula (Cb2) each have the same definition as that for $Rb^{102}$, $Rb^{202}$, $Rb^{402}$, $Rb^{502}$, $Rb^{802}$, and $Rb^{902}$ in Formula (B2), and the specific forms thereof are also the same as each other.

Formula (Cb3)

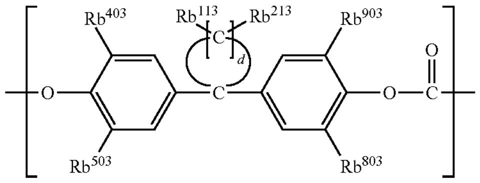

In Formula (Cb3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

$Rb^{113}$, $Rb^{213}$, d, $Rb^{403}$, $Rb^{503}$, $Rb^{803}$, and $Rb^{903}$ in Formula (Cb3) each have the same definition as that for $Rb^{113}$, $Rb^{213}$, d, $Rb^{403}$, $Rb^{503}$, $Rb^{803}$, and $Rb^{903}$ in Formula (B3), and the specific forms thereof are also the same as each other.

Formula (Cb4)

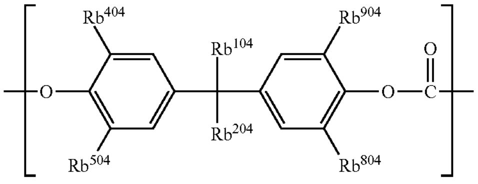

In Formula (Cb4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

$Rb^{104}$, $Rb^{204}$, $Rb^{404}$, $Rb^{504}$, $Rb^{804}$, and $Rb^{904}$ in Formula (Cb4) each have the same definition as that for $Rb^{104}$, $Rb^{204}$, $Rb^{404}$, $Rb^{504}$, $Rb^{804}$ and $Rb^{904}$ in Formula (B4), and the specific forms thereof are also the same as each other.

Formula (Cb5)

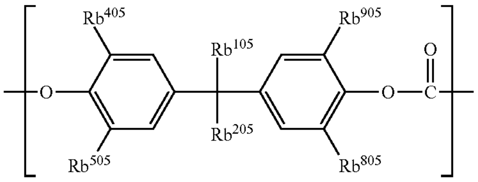

In Formula (Cb5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

$Ar^{105}$, $Rb^{205}$, $Rb^{405}$, $Rb^{505}$, $Rb^{805}$, and $Rb^{905}$ in Formula (Cb5) each have the same definition as that for $Ar^{105}$, $Rb^{205}$, $Rb^{405}$, $Rb^{505}$, $Rb^{805}$, and $Rb^{905}$ in Formula (B5), and the specific forms thereof are also the same as each other.

Formula (Cb6)

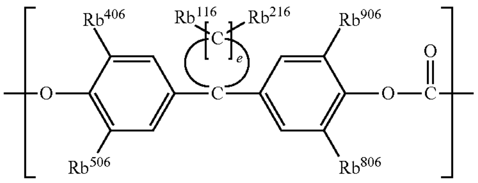

In Formula (Cb6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

$Rb^{116}$, $Rb^{216}$, e, $Rb^{406}$, $Rb^{506}$, $Rb^{806}$, and $Rb^{906}$ in Formula (Cb6) each have the same definition as that for $Rb^{116}$, $Rb^{216}$, e, $Rb^{406}$, $Rb^{506}$, $Rb^{806}$, and $Rb^{906}$ in Formula (B6), and the specific forms thereof are also the same as each other.

Formula (Cb7)

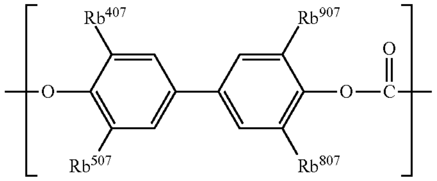

In Formula (Cb7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom.

$Rb^{407}$, $Rb^{507}$, $Rb^{807}$, and $Rb^{907}$ in Formula (Cb7) each have the same definition as that for $Rb^{407}$, $Rb^{507}$, $Rb^{807}$, and $Rb^{907}$ in Formula (B7), and the specific forms thereof are also the same as each other.

Formula (Cb8)

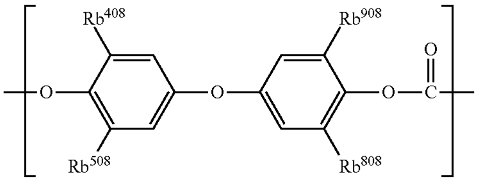

In Formula (Cb8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

$Rb^{408}$, $Rb^{508}$, $Rb^{808}$, and $Rb^{908}$ in Formula (Cb8) each have the same definition as that for $Rb^{408}$, $Rb^{508}$, $Rb^{808}$, and $Rb^{908}$ in Formula (B8), and the specific forms thereof are also the same as each other.

Hereinafter, constitutional units (Ca1-1) to (Ca1-9) are shown as specific examples of the constitutional unit (Ca1). The constitutional unit (Ca1) is not limited thereto.

(Ca 1-1)

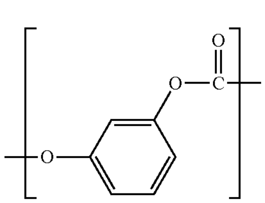

-continued (Ca 1-2)

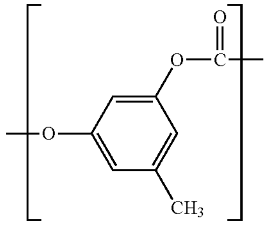

(Ca 1-3)

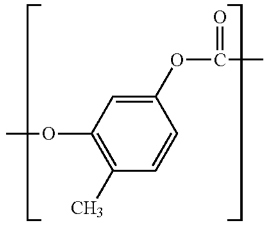

(Ca 1-4)

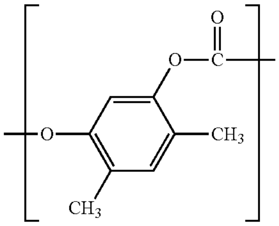

(Ca 1-5)

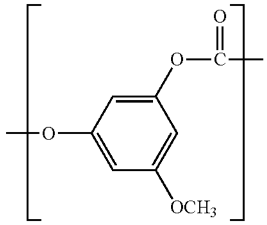

(Ca 1-6)

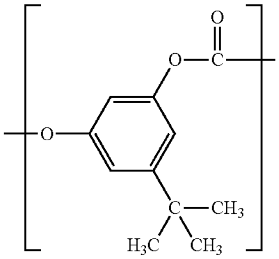

(Ca 1-7)

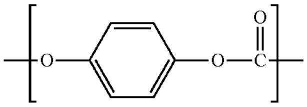

(Ca 1-8)

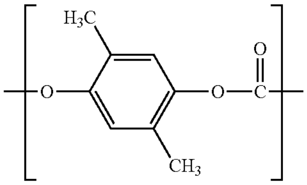

-continued (Ca 1-9)

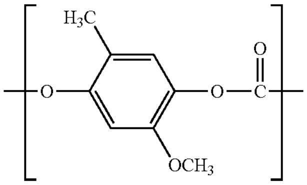

Hereinafter, constitutional units (Ca2-1) to (Ca2-3) are shown as specific examples of the constitutional unit (Ca2). The constitutional unit (Ca2) is not limited thereto.

(Ca 2-1)

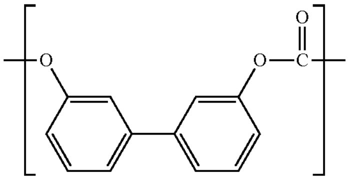

(Ca 2-2)

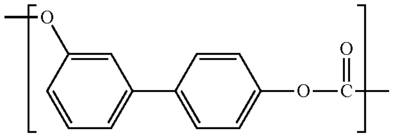

(Ca 2-3)

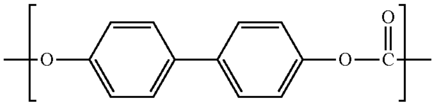

Hereinafter, constitutional units (Ca3-1) and (Ca3-2) are shown as specific examples of the constitutional unit (Ca3). The constitutional unit (Ca3) is not limited thereto.

(Ca 3-1)

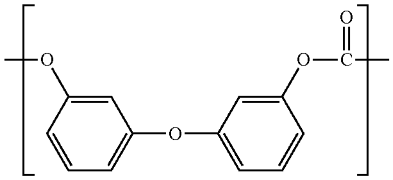

(Ca 3-2)

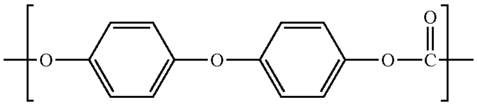

Hereinafter, constitutional units (Ca4-1) to (Ca4-3) are shown as specific examples of the constitutional units (Ca4). The constitutional unit (Ca4) is not limited thereto.

(Ca 4-1)
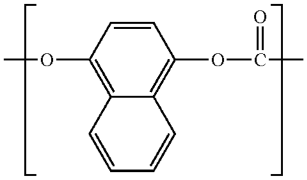
(Ca 4-2)
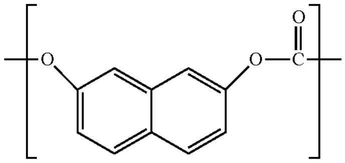
(Ca 4-3)
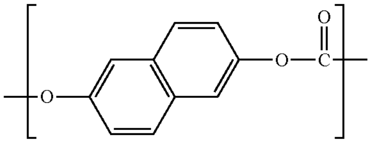
Hereinafter, constitutional units (Cb1-1) to (Cb1-6) are shown as specific examples of the constitutional unit (Cb1). The constitutional unit (Cb1) is not limited thereto.
(Cb 1-1)
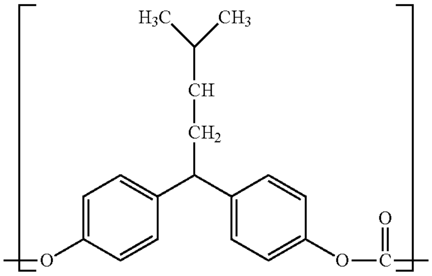
(Cb 1-2)
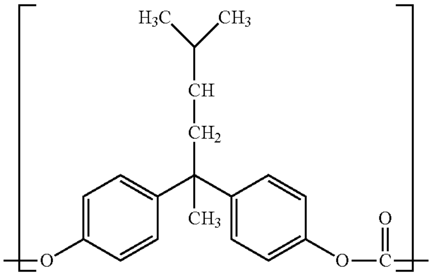
(Cb 1-3)
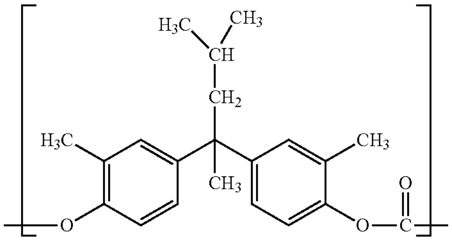
-continued
(Cb 1-4)
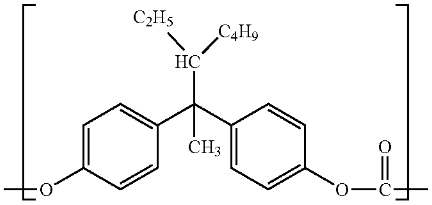
(Cb 1-5)
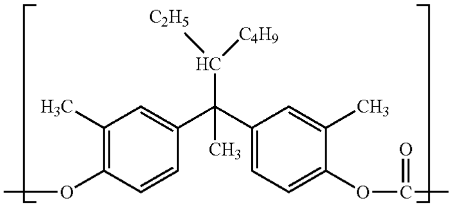
(Cb 1-6)
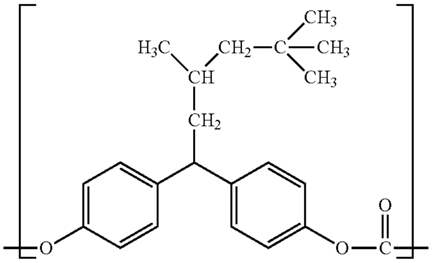
Hereinafter, constitutional units (Cb2-1) to (Cb2-11) are shown as specific examples of the constitutional unit (Cb2). The constitutional unit (Cb2) is not limited thereto.
(Cb2-1)
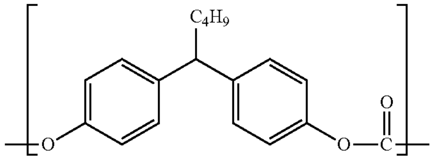
(Cb2-2)
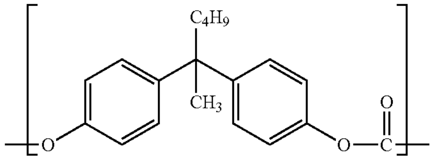
(Cb2-3)
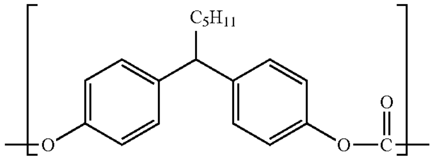
(Cb2-4)
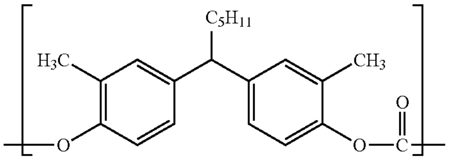

-continued (Cb2-5)

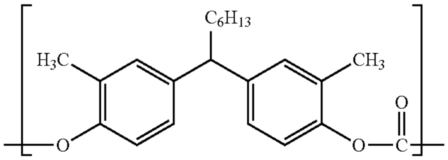

(Cb2-6)

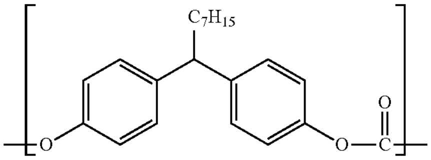

(Cb2-7)

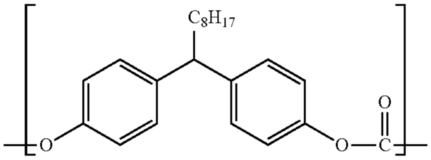

(Cb2-8)

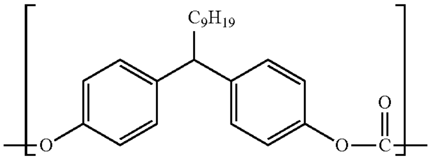

(Cb2-9)

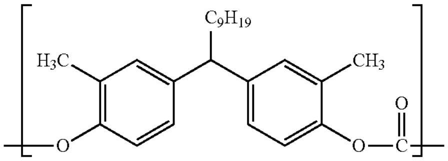

(Cb2-10)

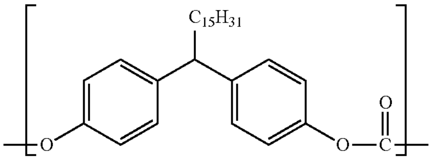

(Cb2-11)

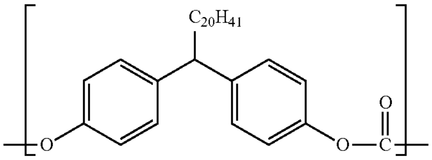

Hereinafter, constitutional units (Cb3-1) to (Cb3-4) are shown as specific examples of the constitutional unit (Cb3). The constitutional unit (Cb3) is not limited thereto.

(Cb 3-1)

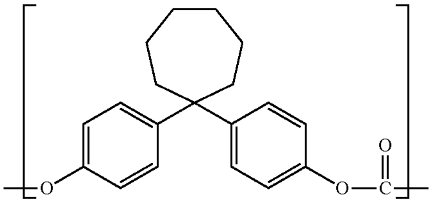

-continued (Cb 3-2)

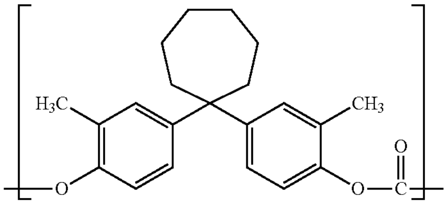

(Cb 3-3)

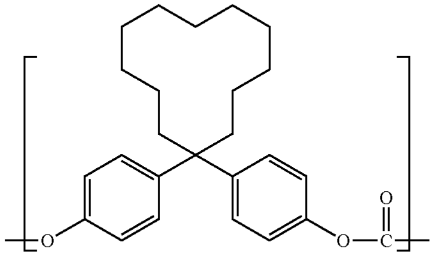

(Cb 3-4)

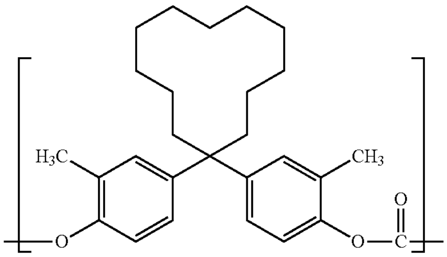

Hereinafter, constitutional units (Cb4-1) to (Cb4-7) are shown as specific examples of the constitutional units (Cb4). The constitutional unit (Cb4) is not limited thereto.

(Cb 4-1)

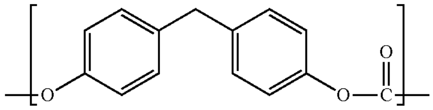

(Cb 4-2)

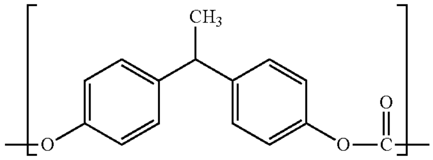

(Cb 4-3)

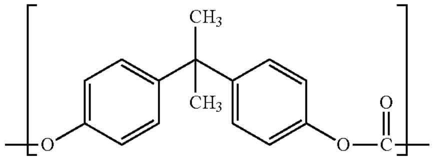

(Cb 4-4)

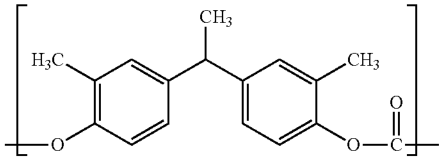

-continued (Cb 4-5)

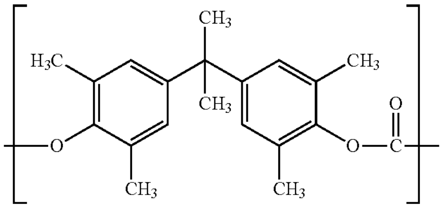

(Cb 4-6)

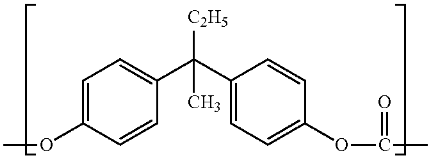

(Cb 4-7)

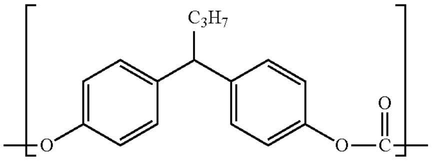

Hereinafter, constitutional units (Cb5-1) to (Cb5-6) are shown as specific examples of the constitutional units (Cb5). The constitutional unit (Cb5) is not limited thereto.

(Cb 5-1)

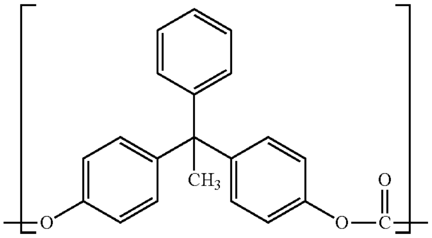

(Cb 5-2)

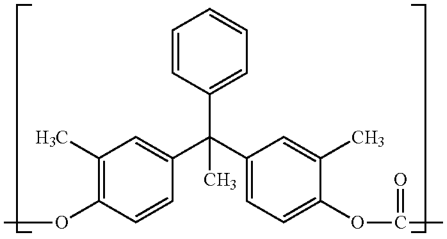

(Cb 5-3)

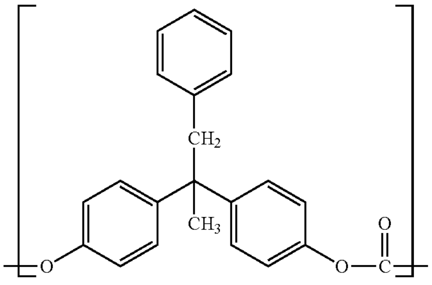

-continued (Cb 5-4)

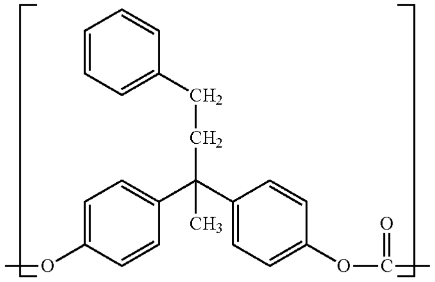

(Cb 5-5)

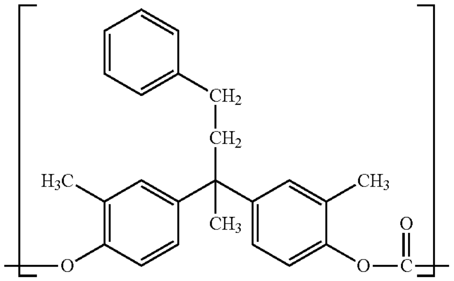

(Cb 5-6)

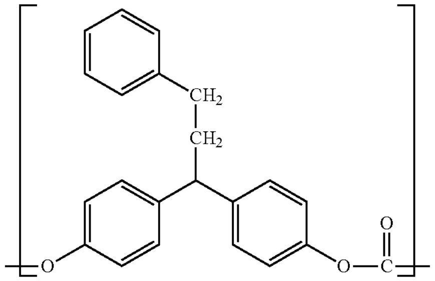

Hereinafter, constitutional units (Cb6-1) to (Cb6-4) are shown as specific examples of the constitutional units (Cb6). The constitutional unit (Cb6) is not limited thereto.

(Cb6-1)

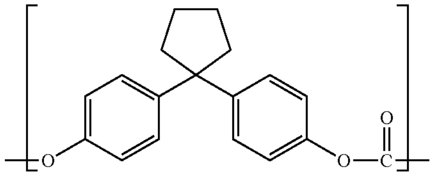

(Cb6-2)

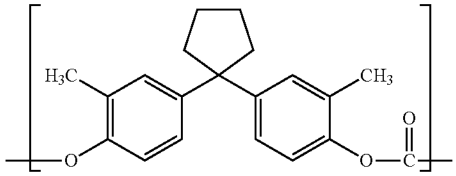

(Cb6-3)

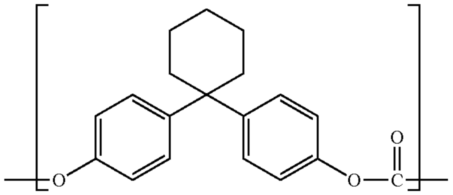

-continued (Cb6-4)

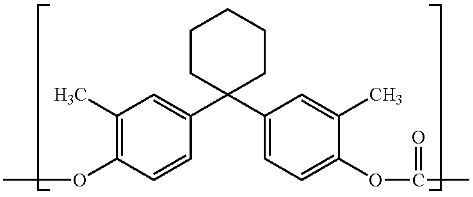

Hereinafter, constitutional units (Cb7-1) to (Cb7-3) are shown as specific examples of the constitutional units (Cb7). The constitutional unit (Cb7) is not limited thereto.

(Cb7-1)

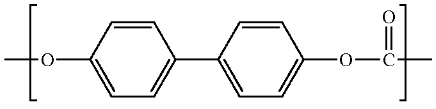

(Cb7-2)

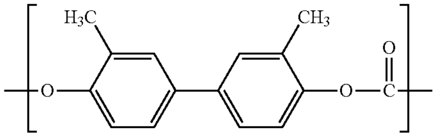

(Cb7-3)

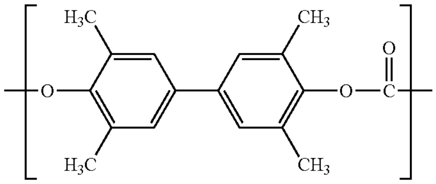

Hereinafter, constitutional units (Cb8-1) to (Cb8-3) are shown as specific examples of the constitutional unit (Cb8). The constitutional unit (Cb8) is not limited thereto.

(Cb8-1)

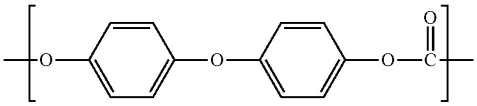

(Cb8-2)

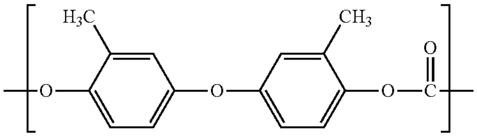

(Cb8-3)

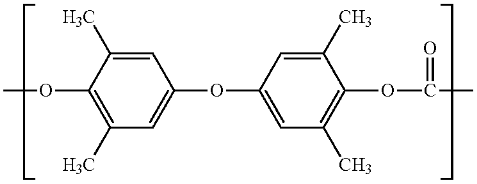

The constitutional unit (C) of the polycarbonate resin (1) may be used alone or two or more kinds thereof.

The polycarbonate resin (1) may have other constitutional units in addition to the constitutional unit (C). Examples of other constitutional units include a constitutional unit derived from an aliphatic diol (such as ethylene glycol, diethylene glycol, triethylene glycol, propylene glycol, butanediol, hexanediol, or neopentyl glycol) and phosgene, and a constitutional unit derived from an alicyclic diol (such as cyclohexanediol, cyclohexane dimethanol, or hydrogenated bisphenol A) and phosgene. These constitutional units of the polycarbonate resin (1) may be used alone or two or more kinds thereof.

The mass proportion of the constitutional unit (C) in the mass of the polycarbonate resin (1) is, for example, preferably 80% by mass or greater and 100% by mass or less, more preferably 90% by mass or greater and 100% by mass or less, and still more preferably 95% by mass or greater and 100% by mass or less.

It is preferable that the polycarbonate resin (1) has, for example, at least one selected from the group consisting of the constitutional unit (Cb1), the constitutional unit (Cb2), the constitutional unit (Cb3), the constitutional unit (Cb4), the constitutional unit (Cb5), the constitutional unit (Cb6), the constitutional unit (Cb7), and the constitutional unit (Cb8) as the constitutional unit (C). The total mass proportion of the constitutional unit (Cb1), the constitutional unit (Cb2), the constitutional unit (Cb3), the constitutional unit (Cb4), the constitutional unit (Cb5), the constitutional unit (Cb6), the constitutional unit (Cb7), and the constitutional unit (Cb8) in the mass of the polycarbonate resin (1) is, for example, preferably 80% by mass or greater and 100% by mass or less, more preferably 90% by mass or greater and 100% by mass or less, and still more preferably 95% by mass or greater and 100% by mass or less.

The weight-average molecular weight of the polycarbonate resin (1) is, for example, preferably 35,000 or greater and 300,000 or less, more preferably 40,000 or greater and 250,000 or less, and still more preferably 50,000 or greater and 200,000 or less.

The molecular weight of the polycarbonate resin (1) is a molecular weight measured by gel permeation chromatography (GPC) in terms of polystyrene. The GPC is carried out by using tetrahydrofuran as an eluent.

Examples of the method of producing the polycarbonate resin (1) include an interfacial polymerization method, a solution polymerization method, and a melt polymerization method.

Photoreceptor

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $1\times10^{13}$ Ωcm.

In a case where the photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. In a case where incoherent light is used as a light source, roughening of the surface to prevent interference fringes is not particularly necessary, and it is appropriate for longer life because occurrence of defects due to the unevenness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the micropores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $1\times10^2$ Ωcm or greater and $1\times10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltri ethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophenone compound; and a diphenoquinone compound such as 3,3',5,5'-tetra-t-butyldiphenoquinone.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

The electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The thickness of the undercoat layer is set to, for example, preferably 15 μm or greater and more preferably 20 μm or greater and 50 μm or less.

Interlayer

An interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, a knife coating method, and a curtain coating method.

The thickness of the interlayer is set to be, for example, preferably in a range of 0.1 μm or greater and 3 μm or less. The interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is, for example, appropriate in a case where an incoherent light source such as a light emitting diode (LED) or an organic electro-luminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichlorotin phthalocyanine, and titanyl phthalocyanine are more preferable.

On the other hand, for example, a fused ring aromatic pigment such as dibromoanthanthrone; a thioindigo-based pigment; a porphyrazine compound; zinc oxide; trigonal selenium; and a bisazo pigment are preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $1\times10^{13}$ Ωcm or greater.

These binder resins may be used alone or in the form of a mixture of two or more kinds thereof.

The blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. The charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a micro-flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The thickness of the charge generation layer is set to, for example, preferably 0.1 μm or greater and 5.0 μm or less and more preferably 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

Examples of the polymer charge transport material include known compounds having charge transport properties, such as poly-N-vinylcarbazole and polysilane. For example, the polyester-based polymer charge transport materials are preferable. The polymer charge transport material may be used alone or in combination with a binder resin.

Examples of the charge transport material or the polymer charge transport material include a polycyclic aromatic compound, an aromatic nitro compound, an aromatic amine compound, a heterocyclic compound, a hydrazone compound, a styryl compound, an enamine compound, a benzidine compound, a triarylamine compound (particularly, a triphenylamine compound), a diamine compound, an oxadiazole compound, a carbazole compound, an organic polysilane compound, a pyrazoline compound, an indole compound, an oxazole compound, an isoxazole compound, a thiazole compound, a thiadiazole compound, an imidazole compound, a pyrazole compound, a triazole compound, a cyano compound, a benzofuran compound, an aniline compound, a butadiene compound, and a resin containing a group derived from any of these substances. Specific examples thereof include compounds described in paragraphs 0078 to 0080 of JP2021-117377A, paragraphs 0046 to 0048 of JP2019-035900A, paragraphs 0052 and 0053 of JP2019-012141A, paragraphs 0122 to 0134 of JP2021-071565A, paragraphs 0101 to 0110 of JP2021-015223A, paragraph 0116 of JP2013-097300A, paragraphs 0309 to 0316 of WO2019/070003A, paragraphs 0103 to 0107 of JP2018-159087A, and paragraphs 0102 to 0113 of JP2021-148818A.

From the viewpoint of the charge mobility, it is preferable that the charge transport material contains, for example, at least one selected from the group consisting of a compound (D1) represented by Formula (D1), a compound (D2) represented by Formula (D2), a compound (D3) represented by Formula (D3), and a compound (D4) represented by Formula (D4).

Formula (D1)

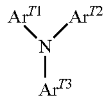

In Formula (D1), $Ar^{T1}$, $Ar^{T2}$, and $Ar^{T3}$ each independently represent an aryl group, $—C_6H_4—C(R^{T4})═C(R^{T5})(R^{T6})$, or $—C_6H_4—CH═CH—CH═C(R^{T7})(R^{T8})$. $R^{T4}$, $R^{T5}$, $R^{T6}$, $R^{T7}$, and $R^{T8}$ each independently represent a hydrogen atom, an alkyl group, or an aryl group. In a case where $R^{T5}$ and $R^{T6}$ represent an aryl group, the aryl groups may be linked via a divalent group of $—C(R^{51})(R^{52})—$ and/or $—C(R^{61})═C(R^{62})—$. $R^{51}$, $R^{52}$, $R^{61}$, and $R^{62}$ each independently represent a hydrogen atom or an alkyl group having 1 or more and 3 or less carbon atoms.

The group in Formula (D1) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the compound (D1), for example, a compound containing at least one of an aryl group or $—C_6H_4—CH═CH—CH═C(R^{T7})(R^{T8})$ is preferable, and a compound (D'1) represented by Formula (D'1) is more preferable.

Formula (D'1)

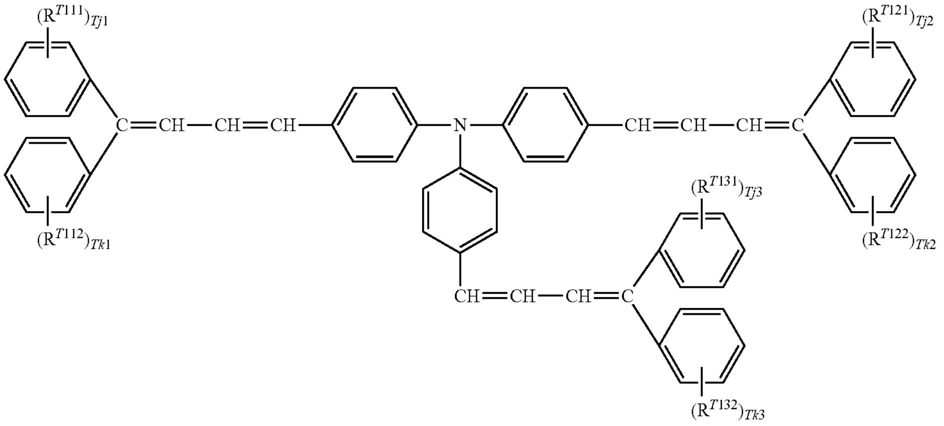

In Formula (D'1), $R^{T111}$, $R^{T112}$, $R^{T121}$, $R^{T122}$, $R^{T131}$, and $R^{T132}$ each independently represent a hydrogen atom, a halogen atom, an alkyl group (for example, preferably an alkyl group having 1 or more and 3 or less carbon atoms), an alkoxy group (for example, preferably an alkoxy group having 1 or more and 3 or less carbon atoms), a phenyl group, or a phenoxy group. Tj1, Tj2, Tj3, Tk1, Tk2, and Tk3 each independently represent 0, 1, or 2.

Formula (D2)

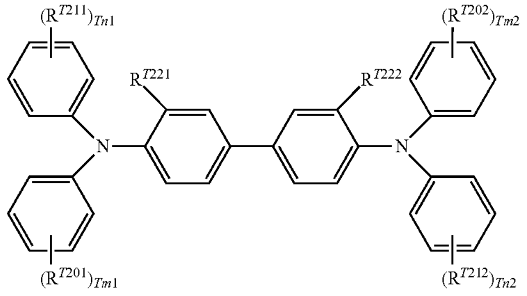

In Formula (D2), $R^{T201}$, $R^{T202}$, $R^{T211}$, and $R^{T212}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T21})═C(R^{T22})(R^{T23})$, or $—CH═CH—CH═C(R^{T24})(R^{T25})$. $R^{T21}$, $R^{T22}$, $R^{T23}$, $R^{T24}$, and $R^{T25}$ each independently represent a hydrogen atom, an alkyl group, or an aryl group. $R^{T221}$ and $R^{T222}$ each independently represent a hydrogen atom, a halogen atom, an alkyl groups having 1 or more and 5 or less carbon atoms, or an alkoxy group having 1 or more and 5 or less carbon atoms. Tm1, Tm2, Tn1, and Tn2 each independently represent 0, 1, or 2.

The group in Formula (D2) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the compound (D2), for example, a compound containing at least one of an alkyl group, an aryl group, or $—CH═CH—CH═C(R^{T24})(R^{T25})$ is preferable, and a compound containing two of an alkyl group, an aryl group, or $—CH═CH—CH═C(R^{T24})(R^{T25})$ is more preferable.

Formula (D3)

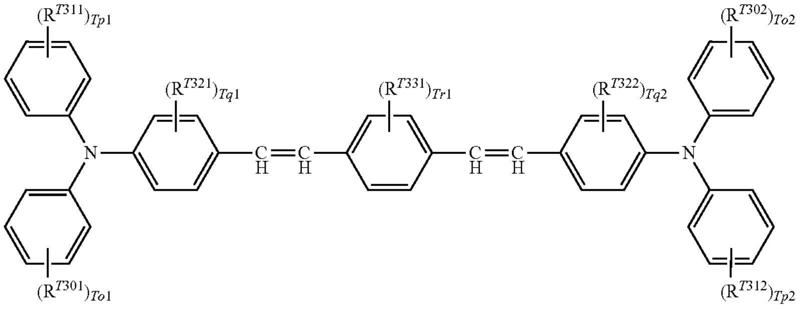

In Formula (D3), $R^{T301}$, $R^{T302}$, $R^{T311}$, and $R^{T312}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T31})═C(R^{T32})(R^{T33})$, or $—CH═CH—CH═C(R^{T34})(R^{T35})$. $R^{T31}$, $R^{T32}$, $R^{T33}$, $R^{T34}$, and $R^{T35}$ each independently represent a hydrogen atom, an alkyl group, or an aryl group. $R^{T321}$, $R^{T322}$, and $R^{T331}$ each independently represent a hydrogen atom, a halogen atom, an alkyl group having 1 or more and 5 or less carbon atoms, or an alkoxy group having 1 or more and 5 or less carbon atoms. To1, To2, Tp1, Tp2, Tq1, Tq2, and Tr1 each independently represent 0, 1, or 2.

The group in Formula (D3) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

Formula (D4)

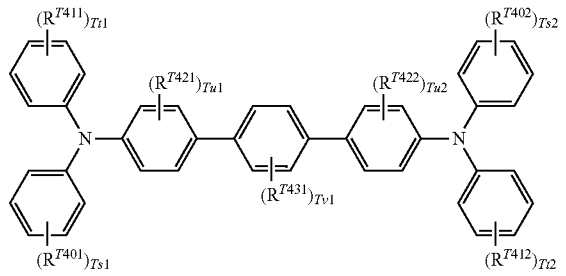

In Formula (D4), $R^{T401}$, $R^{T402}$, $R^{T411}$, and $R^{T412}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T41})═C(R^{T42})(R^{T43})$, or $—CH═CH—CH═C(R^{T44})(R^{T45})$. $R^{T41}$, $R^{T42}$, $R^{T43}$, $R^{T44}$, and $R^{T45}$ each independently represent a hydrogen atom, an alkyl group, or an aryl group. $R^{T421}$, $R^{T422}$, and $R^{T431}$ each independently represent a hydrogen atom, a halogen atom, an alkyl group having 1 or more and 5 or less carbon atoms, or an alkoxy group having 1 or more and 5 or less carbon atoms. Ts1, Ts2, Tt1, Tt2, Tu1, Tu2, and Tv1 each independently represent 0, 1, or 2.

The group in Formula (D4) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

The content of the charge transport material contained in the charge transport layer is, for example, preferably 20% by mass or greater and 70% by mass or less with respect to the total mass of the charge transport layer.

It is preferable that the charge transport layer contains, for example, at least the polyester resin (1) and/or the polycarbonate resin (1) as a binder resin. The total proportion of the polyester resin (1) and the polycarbonate resin (1) in the total amount of the binder resin contained in the charge transport layer is, for example, preferably 50% by mass or greater, more preferably 80% by mass or greater, still more preferably 90% by mass or greater, particularly preferably 95% by mass or greater, and most preferably 100% by mass.

The charge transport layer may contain other binder resins in addition to the polyester resin (1) and the polycarbonate resin (1). Examples of other binder resins include a polyester resin other than the polyester resin (1), a polycarbonate resin other than the polycarbonate resin (1), a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. These binder resins may be used alone or in combination of two or more kinds thereof.

The charge transport layer may also contain other known additives. Examples of the additives include an antioxidant, a leveling agent, an antifoaming agent, a filler, and a viscosity adjuster.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The average thickness of the charge transport layer is, for example, preferably 5 μm or greater and 60 μm or less, more preferably 10 μm or greater and 55 μm or less, and still more preferably 15 μm or greater and 50 μm or less.

Single Layer Type Photosensitive Layer

The single layer type photosensitive layer (charge generation/charge transport layer) is a layer containing a charge generation material, a charge transport material, a binder resin, and as necessary, other additives. These materials are the same as the materials described in the sections of the charge generation layer and the charge transport layer.

It is preferable that the single layer type photosensitive layer contains, for example, at least the polyester resin (1) and/or the polycarbonate resin (1) as a binder resin. The total proportion of the polyester resin (1) and the polycarbonate resin (1) in the total amount of the binder resin contained in the single layer type photosensitive layer is, for example, preferably 50% by mass or greater, more preferably 80% by mass or greater, still more preferably 90% by mass or greater, particularly preferably 95% by mass or greater, and most preferably 100% by mass.

The content of the charge generation material in the single layer type photosensitive layer may be, for example, 0.1% by mass or greater and 10% by mass or less and preferably 0.8% by mass or greater and 5% by mass or less with respect to the total solid content.

The content of the charge transport material contained in the single layer type photosensitive layer may be, for example, 40% by mass or greater and 60% by mass or less with respect to the total solid content.

The method of forming the single layer type photosensitive layer is the same as the method of forming the charge generation layer or the charge transport layer.

The average thickness of the single layer type photosensitive layer is, for example, preferably 5 μm or greater and 60 μm or less, more preferably 10 μm or greater and 55 μm or less, and still more preferably 15 μm or greater and 50 μm or less.

Protective Layer

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)

2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], $—NH_2$, —SH, —COOH, and $—SiR^{Q1}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a phenyl vinyl group, a vinyl phenyl group, an acryloyl group, a methacryloyl group, and a group containing at least one selected from derivatives thereof. Among these, from the viewpoint that the reactivity is excellent, for example, a vinyl group, a phenylvinyl group, a vinylphenyl group, an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

The coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, a knife coating method, and a curtain coating method.

The thickness of the protective layer is set to, for example, preferably 1 μm or greater and 20 μm or less and more preferably 2 μm or greater and 10 μm or less.

Charging Member

The charging member may be any of a charging member in a system in which only a direct current voltage is applied (DC charging system), a charging member in a system in which only an alternating current voltage is applied (AC charging system), or a charging member in a system in which a voltage obtained by superimposing an alternating voltage on a direct voltage is applied (AC/DC charging system).

The charging member comes into contact with the surface of the photoreceptor to charge the photoreceptor. The charging member includes a support member and an elastic layer provided on the support member. The charging member may further have a surface layer that protects the elastic layer. The charging member may have a roll shape or a belt shape.

Figure 3:
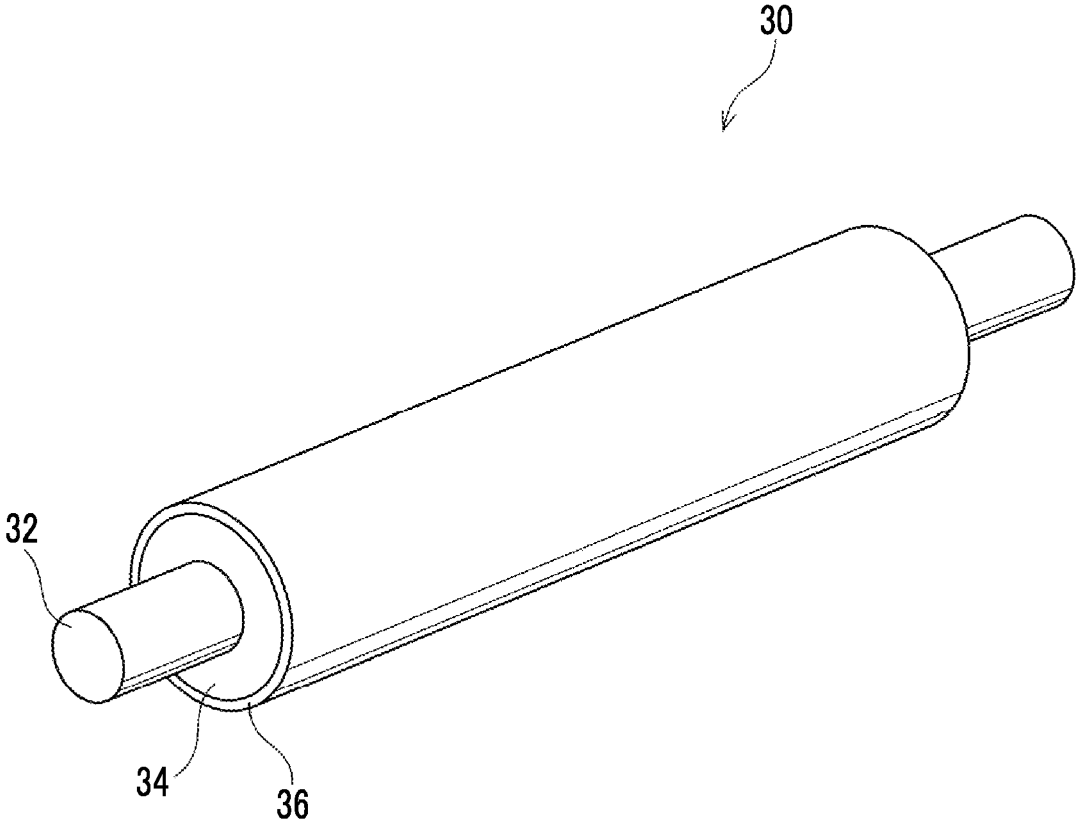
FIG. 3 is a schematic perspective view showing an example of a charging member of an image forming unit according to the present exemplary embodiment.

FIG. 3 is a schematic perspective view showing an example of the charging member. A charging member 30 shown in FIG. 3 has a structure in which an elastic layer 34 and a surface layer 36 are laminated in this order on a support member 32.

Support Member

The support member is a conductive member that functions as an electrode and a support of the charging member. The support member may be a hollow member or a non-hollow member, and may be, for example, a rod-like, cylindrical, or endless belt-like member.

Examples of the support member include a member formed of a metal such as iron (free-cutting steel or the like), copper, brass, stainless steel, aluminum, or nickel; an iron member plated with chromium, nickel, or the like; a member obtained by performing a plating treatment on an outer peripheral surface of a resin or ceramic member; and a resin or ceramic member containing a conductive agent.

Elastic Layer

It is preferable that the elastic layer has, for example, conductivity and a volume resistivity of $1\times10^3$ Ωcm or greater and $1\times10^{14}$ Ωcm or less.

The elastic layer may be a foam elastic layer or a non-foam elastic layer. The elastic layer may be disposed on the outer peripheral surface of the support member directly or via an adhesive layer.

According to an exemplary embodiment, the elastic layer contains an elastic material, a conductive agent, and other additives. Examples of other additives include a filler, a vulcanization agent, a vulcanization accelerator, a vulcanization accelerator assistant, a softener, a plasticizer, a curing agent, an antioxidant, and a coupling agent.

Examples of the elastic material include polyurethane, nitrile rubber, isoprene rubber, butadiene rubber, ethylene-propylene rubber, ethylene-propylene-diene rubber, epichlorohydrin rubber, epichlorohydrin-ethylene oxide rubber, epichlorohydrin-ethylene oxide-allyl glycidyl ether rubber, styrene-butadiene rubber, acrylonitrile-butadiene rubber, chloroprene rubber, chlorinated polyisoprene, hydrogenated polybutadiene, butyl rubber, silicone rubber, fluororubber, natural rubber, and elastic materials obtained by mixing these materials. Among these elastic materials, for example, polyurethane, silicone rubber, nitrile rubber, epichlorohydrin rubber, epichlorohydrin-ethylene oxide rubber, epichlorohydrin-ethylene oxide-allyl glycidyl ether rubber, ethylene-propylene-diene rubber, acrylonitrile-butadiene rubber, and elastic materials obtained by mixing these materials are preferable.

Examples of the conductive agent include an electronic conductive agent and an ionic conductive agent. Examples of the electronic conductive agent include powder, for example, carbon black such as furnace black, thermal black, channel black, ketjen black, acetylene black, or color black; thermally decomposed carbon; graphite; a metal such as aluminum, copper, nickel, or stainless steel and an alloy thereof; a metal oxide such as tin oxide, indium oxide, titanium oxide, a tin oxide-antimony oxide solid solution, or a tin oxide-indium oxide solid solution; and a substance obtained by performing a conduction treatment on the surface of an insulating material. Examples of the ionic conductive agent include perchlorates or chlorates of tetraethylammonium, lauryltrimethylammonium, and benzyltrialkylammonium; and perchlorates or chlorates of alkali metals such as lithium and magnesium or alkaline earth metals. The conductive agent may be used alone or in combination of two or more kinds thereof.

It is preferable that the total content of the conductive agent contained in the elastic layer is, for example, set using the volume resistivity of the elastic layer as a reference.

As the conductive agent, for example, carbon black is preferable. The average primary particle diameter of the carbon black is, for example, preferably 1 nm or greater and 500 nm or less and more preferably 5 nm or greater and 200 nm or less. The content of the carbon black is, for example, preferably 0.1 part by mass or greater and 20 parts by mass or less and more preferably 1 part by mass or greater and 10 parts by mass or less with respect to 100 parts by mass of the elastic material.

Examples of the filler include calcium carbonate, silica, and clay mineral. The filler may be used alone or in combination of two or more kinds thereof.

As the filler, for example, calcium carbonate is preferable. The average primary particle diameter of calcium carbonate is, for example, preferably 1 nm or greater and 500 nm or less and more preferably 5 nm or greater and 200 nm or less. The content of calcium carbonate is, for example, preferably 1 part by mass or greater and 50 parts by mass or less and more preferably 10 parts by mass or greater and 40 parts by mass or less with respect to 100 parts by mass of the elastic material.

From the viewpoint that the storage elastic modulus G' of the elastic layer is controlled to be in a range of 1.0 MPa or greater and 5.0 MPa or less, it is preferable that the elastic layer contains, for example, an elastic material, carbon black, and calcium carbonate and that the content of the carbon black is 1 part by mass or greater and 10 parts by mass or less with respect to 100 parts by mass of the elastic material and the content of the calcium carbonate is 10 parts by mass or greater and 40 parts by mass or less with respect to 100 parts by mass of the elastic material.

The mass ratio of the content of carbon black to the content of calcium carbonate (carbon black:calcium carbonate) is, for example, preferably in a range of 100:200 to 100:5,000, more preferably in a range of 100:300 to 100:4,000, and still more preferably in a range of 100:500 to 100:3,000.

The layer thickness of the elastic layer is, for example, preferably 1 mm or greater and 10 mm or less and more preferably 2 mm or greater and 5 mm or less.

Examples of a method of forming the elastic layer on the support member include a method of extruding a composition for forming an elastic layer which is obtained by mixing an elastic material, a conductive agent, and other additives and a cylindrical support member from an extrusion molding machine, forming a layer of the composition for forming an elastic layer on the outer peripheral surface of the support member, and heating the layer of the composition for forming an elastic layer to cause a crosslinking reaction (including vulcanization) so that an elastic layer is obtained; and a method of extruding a composition for forming an elastic layer which is obtained by mixing an elastic material, a conductive agent, and other additives onto the outer peripheral surface of an endless belt-like support member from an extrusion molding machine, forming a layer of the composition for forming an elastic layer on the outer peripheral surface of the support member, and heating the layer of the composition for forming an elastic layer to cause a crosslinking reaction (including vulcanization) so that an elastic layer is obtained. The support member may include an adhesive layer on the outer peripheral surface thereof.

Adhesive Layer

Examples of the adhesive layer sandwiched between the elastic layer and the support member include a resin layer, and specific examples thereof include a resin layer such as a polyolefin, an acrylic resin, an epoxy resin, polyurethane, nitrile rubber, chlorine rubber, a vinyl chloride resin, a vinyl acetate resin, a polyester resin, a phenol resin, or a silicone resin. The adhesive layer may contain a conductive agent (for example, the electronic conductive agent or the ionic conductive agent described above).

From the viewpoint of the adhesiveness between the elastic layer and the support member, the thickness of the adhesive layer is, for example, preferably 1 μm or greater and 80 or less, more preferably 2 μm or greater and 50 μm or less, and still more preferably 5 or greater and 20 μm or less.

Surface Layer

In a case where the charging member includes a surface layer, the surface layer constitutes the outermost peripheral surface of the charging member. It is preferable that the surface layer has, for example, conductivity and a volume resistivity of $1\times10^5$ Ωcm or greater and $1\times10^8$ Ωcm or less.

According to an exemplary embodiment, the surface layer contains a binder resin, a conductive agent, and other additives.

Examples of the binder resin of the surface layer include polyamide, polyimide, polyester, polyethylene, polyurethane, a phenol resin, a silicone resin, an acrylic resin, a melamine resin, an epoxy resin, polyvinylidene fluoride, a tetrafluoroethylene copolymer, polyvinyl butyral, an ethylene-tetrafluoroethylene copolymer, fluororubber, polycarbonate, polyvinyl alcohol, polyvinylidene chloride, polyvinyl chloride, an ethylene-vinyl acetate copolymer, and cellulose. The binder resin may be used alone or in combination of two or more kinds thereof.

As the conductive agent contained in the surface layer, for example, conductive particles having a volume resistivity of $1\times10^9$ Ωcm or less are desirable. Examples of the conductive particles include a metal oxide such as tin oxide, titanium oxide, or zinc oxide, and carbon black.

From the viewpoint that the dispersibility in the binder resin is excellent, it is preferable that the conductive particles contained in the surface layer have, for example, a primary particle diameter of 10 nm or greater and 50 nm or less.

The content of the conductive particles in the surface layer is, for example, preferably 5 parts by mass or greater and 50 parts by mass or less and more preferably 10 parts by mass or greater and 30 parts by mass or less with respect to 100 parts by mass of the binder resin.

The surface layer may contain particles for forming unevenness for the purpose of forming micro-unevenness on the surface thereof. The content of the particles for forming unevenness with a volume average particle diameter of 5 μm or greater and 20 μm or less in the surface layer is, for example, preferably 5 parts by mass or greater and 30 parts by mass or less with respect to 100 parts by mass of the binder resin. It is preferable that the particles for forming unevenness are, for example, resin particles such as polyamide particles, fluororesin particles, and silicone resin particles.

The thickness of the surface layer is, for example, preferably 1 μm or greater and 20 μm or less, more preferably 2 μm or greater and 15 μm or less, and still more preferably 3 μm or greater and 10 μm or less.

Examples of a method of forming the surface layer on the elastic layer include a method of coating the outer peripheral surface of the elastic layer with a composition for forming a surface layer which is obtained by mixing a binder resin, a conductive agent, and other additives to form a layer of the composition for forming a surface layer and drying the layer of the composition for forming a surface layer. Examples of a method of coating the outer peripheral surface of the elastic layer with the composition for forming a surface layer include dip coating, roll coating, blade coating, wire bar coating, spray coating, bead coating, air knife coating, and curtain coating.

Image Forming Apparatus and Process Cartridge

An image forming apparatus according to the present exemplary embodiment includes the photoreceptor, a charging member that charges a surface of the photoreceptor, an electrostatic latent image forming unit that forms an electrostatic latent image on the charged surface of the photoreceptor, a developing unit that develops the electrostatic latent image formed on the surface of the photoreceptor with a developer containing a toner to form a toner image, and a transfer unit that transfers the toner image to a surface of a recording medium. Further, the image forming unit according to the present exemplary embodiment is employed as the photoreceptor and the charging member.

As the image forming apparatus according to the present exemplary embodiment, known image forming apparatuses such as an apparatus including a fixing unit that fixes the toner image transferred to the surface of a recording medium; a direct transfer type apparatus that transfers the toner image formed on the surface of the photoreceptor directly to the recording medium; an intermediate transfer type apparatus that primarily transfers the toner image formed on the surface of the photoreceptor to the surface of the intermediate transfer member and secondarily transfers the toner image transferred to the surface of the intermediate transfer member to the surface of the recording medium; an apparatus including a cleaning unit that cleans the surface of the photoreceptor after the transfer of the toner image and before the charging; an apparatus including a destaticizing unit that destaticizes the surface of the photoreceptor by irradiating the surface with destaticizing light after the transfer of the toner image and before the charging; or an apparatus including a photoreceptor heating member for increasing the temperature of the photoreceptor and decreasing the relative temperature are employed.

In a case of the intermediate transfer type apparatus, the transfer unit is, for example, configured to include an intermediate transfer member having a surface onto which the toner image is transferred, a primary transfer unit primarily transferring the toner image formed on the surface of the photoreceptor to the surface of the intermediate transfer member, and a secondary transfer unit secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

In the image forming apparatus according to the present exemplary embodiment, for example, the portion including the photoreceptor may have a cartridge structure (process cartridge) that is attachable to and detachable from the image forming apparatus. As the process cartridge, for example, a process cartridge including the image forming unit according to the present exemplary embodiment is preferably used. The process cartridge may include, for example, at least one selected from the group consisting of an electrostatic latent image forming unit, a developing unit, and a transfer unit in addition to the photoreceptor and the charging member.

Hereinafter, an example of the image forming apparatus according to the present exemplary embodiment will be described, but the present exemplary embodiment is not limited thereto. Further, main parts shown in the figures will be described, but description of other parts will not be provided.

Figure 4:
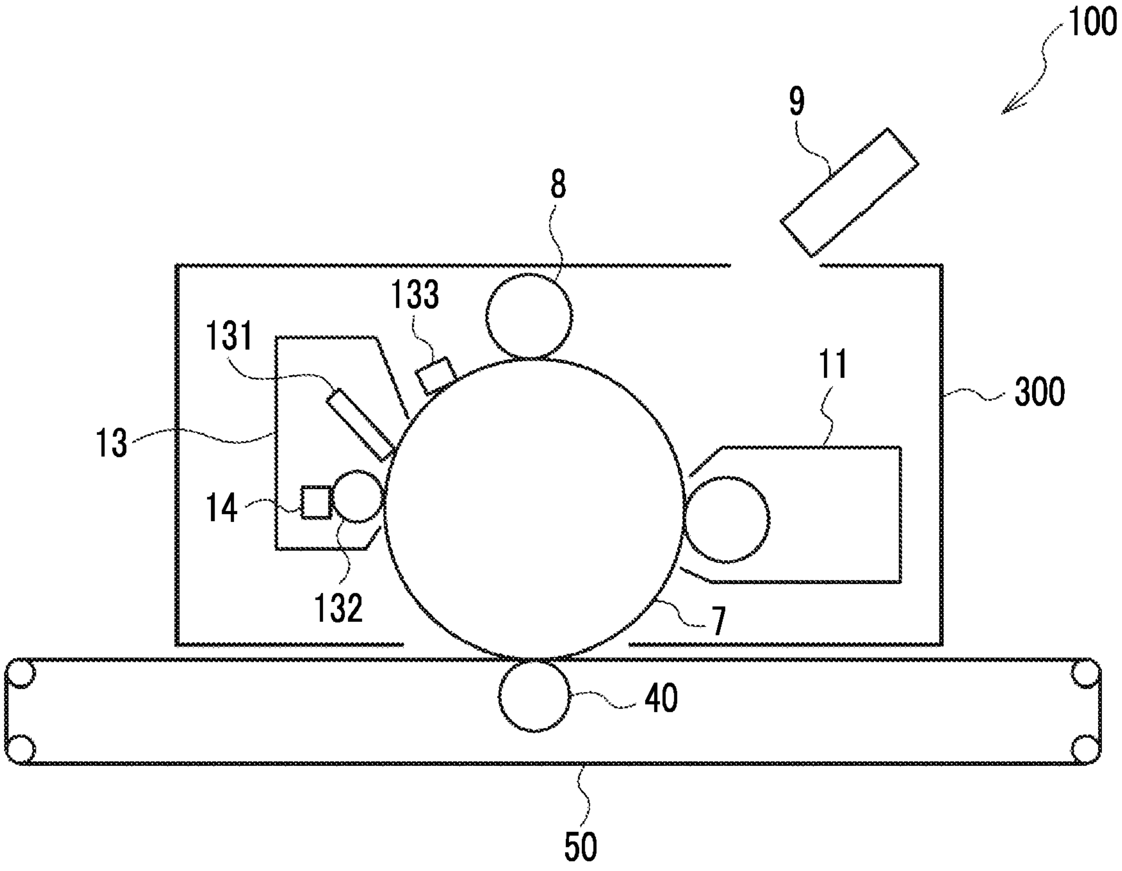
FIG. 4 is a schematic configuration view showing an example of an image forming apparatus according to the present exemplary embodiment.

FIG. 4 is a schematic configuration view showing an example of the image forming apparatus according to the present exemplary embodiment.

As shown in FIG. 4, an image forming apparatus 100 according to the present exemplary embodiment includes a process cartridge 300 including a photoreceptor 7, an exposure device 9 (an example of an electrostatic latent image forming unit), a transfer device 40 (primary transfer device), and an intermediate transfer member 50. In the image forming apparatus 100, the exposure device 9 is disposed at a position that can be exposed to the photoreceptor 7 from an opening portion of the process cartridge 300, the transfer device 40 is disposed at a position that faces the photoreceptor 7 via the intermediate transfer member 50, and the intermediate transfer member 50 is disposed such that a part of the intermediate transfer member 50 is in contact with the photoreceptor 7. Although not shown, the image forming apparatus also includes a secondary transfer device that transfers the toner image transferred to the intermediate transfer member 50 to a recording medium (for example, paper). The intermediate transfer member 50, the transfer device 40 (primary transfer device), and the secondary transfer device (not shown) correspond to an example of the transfer unit.

The process cartridge 300 in FIG. 4 integrally supports the photoreceptor 7, a charging device 8 (an example of the charging unit including the charging member), a developing device 11 (an example of the developing unit), and a cleaning device 13 (an example of the cleaning unit) in a housing. The cleaning device 13 has a cleaning blade (an example of the cleaning member) 131, and the cleaning blade 131 is disposed to come into contact with the surface of the photoreceptor 7. The cleaning member may be a conductive or insulating fibrous member instead of the aspect of the cleaning blade 131, and may be used alone or in combination with the cleaning blade 131. The image forming unit according to the present exemplary embodiment is employed as the photoreceptor 7 and the charging member of the charging device 8.

FIG. 4 shows an example of an image forming apparatus including a fibrous member 132 (roll shape) that supplies a lubricant 14 to the surface of the photoreceptor 7 and a fibrous member 133 (flat brush shape) that assists cleaning, but these are disposed as necessary.

Hereinafter, each configuration other than the photoreceptor 7 and the charging device 8 will be described.

Exposure Device

Examples of the exposure device 9 include an optical system device that exposes the surface of the photoreceptor 7 to light such as a semiconductor laser beam, LED light, and liquid crystal shutter light in a predetermined image pattern. The wavelength of the light source is set to be within the spectral sensitivity region of the photoreceptor. As the wavelength of a semiconductor laser, near infrared, which has an oscillation wavelength in the vicinity of 780 nm, is mostly used. However, the wavelength is not limited thereto, and a laser having an oscillation wavelength of approximately 600 nm or a laser having an oscillation wavelength of 400 nm or greater and 450 nm or less as a blue laser may also be used. Further, a surface emission type laser light source capable of outputting a multi-beam is also effective for forming a color image.

Developing Device

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the photoreceptor 7 using a brush, a roller, or the like. Among these, for example, a developing device formed of a developing roller having a surface on which a developer is held is preferably used.

The developer used in the developing device 11 may be a one-component developer containing only a toner or a two-component developer containing a toner and a carrier. Further, the developer may be magnetic or non-magnetic. Known developers are employed as these developers.

Cleaning Device

As the cleaning device 13, a cleaning blade type device including the cleaning blade 131 is used. In addition to the cleaning blade type device, a fur brush cleaning type device or a simultaneous development cleaning type device may be employed.

Transfer Device

Examples of the transfer device 40 include a known transfer charger such as a contact-type transfer charger using a belt, a roller, a film, a rubber blade, or the like, or a scorotron transfer charger or a corotron transfer charger using corona discharge.

Intermediate Transfer Member

As the intermediate transfer member 50, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Figure 5:
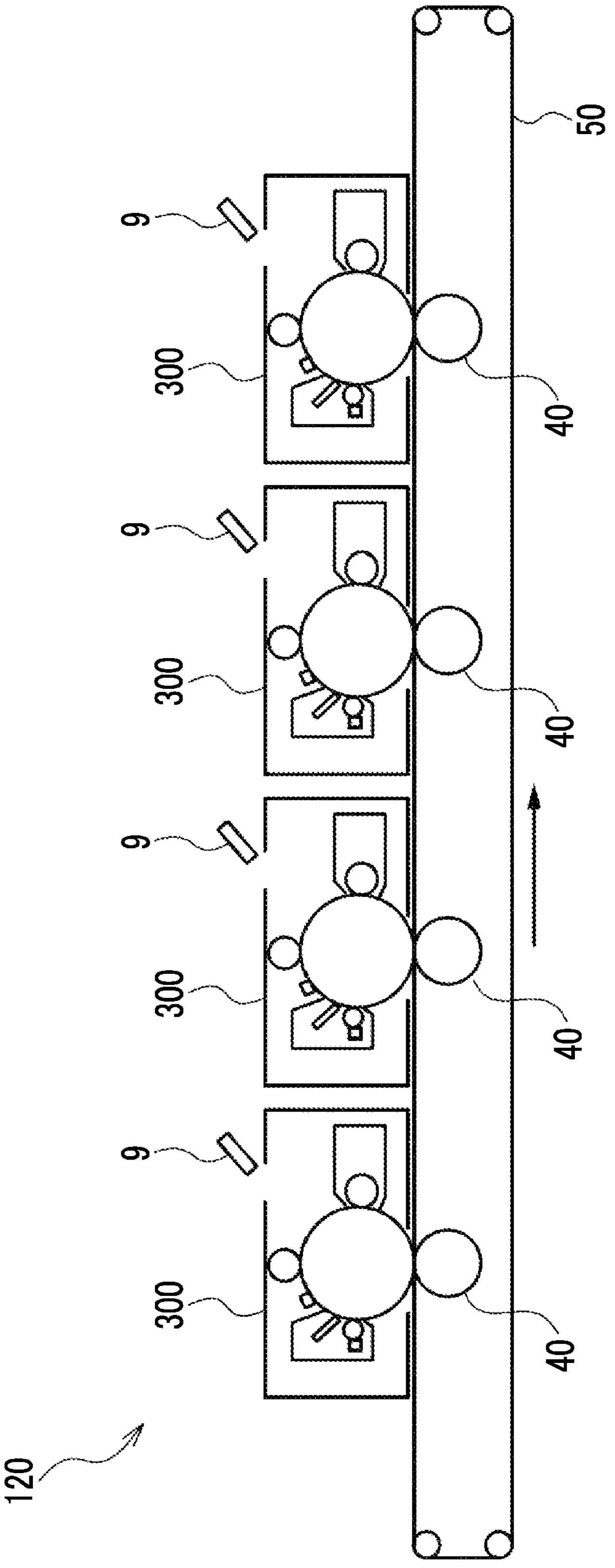
FIG. 5 is a schematic configuration view showing another example of an image forming apparatus according to the present exemplary embodiment.

FIG. 5 is a schematic configuration view showing another example of an image forming apparatus according to the present exemplary embodiment.

An image forming apparatus 120 shown in FIG. 5 is a tandem type multicolor image forming apparatus on which four process cartridges 300 are mounted. The image forming apparatus 120 is formed such that four process cartridges 300 are arranged in parallel on the intermediate transfer member 50, and one photoreceptor is used for each color. The image forming apparatus 120 has the same configuration as the image forming apparatus 100 except that the image forming apparatus 120 is of a tandem type.

EXAMPLES

Hereinafter, exemplary embodiments of the invention will be described in detail based on examples, but the exemplary embodiments of the invention are not limited to the examples.

In the following description, "parts" and "%" are on a mass basis unless otherwise specified.

In the following description, the synthesis, the treatment, the production, and the like are carried out at room temperature (25° C.±3° C.) unless otherwise specified.

Production of Charging Member

Charging Roll (1)

Preparation of Support Member

A base material made of SUM23L is subjected to electroless nickel plating and subjected to a hexavalent chromic acid treatment, thereby obtaining a support member having a diameter of 8 mm.

Formation of Adhesive Layer

- Chlorinated polypropylene resin (maleic anhydride chlorinated polypropylene resin, SUPERCHLON 930, manufactured by Nippon Paper Industries Co., Ltd.): 100 parts
- Epoxy resin (EP4000, manufactured by ADEKA Corporation): 10 parts
- Conductive agent (Carbon Black, Ketjen Black EC, manufactured by Ketjen Black International Company): 2.5 parts
- Toluene or xylene: amount for adjusting viscosity The above-described materials are mixed with a ball mill for 1 hour, and the surface of the support member is brush-coated with the mixture, thereby forming an adhesive layer having a thickness of 10 μm.

Formation of Elastic Layer

- Epichlorohydrin-ethylene oxide-allyl glycidyl ether rubber (EPION301, manufactured by Osaka Soda Co., Ltd.): 100 parts
- Carbon black (3030B, manufactured by Mitsubishi Chemical Corporation): 2 parts
- Calcium carbonate (Viscoexcel 30, manufactured by Shiraishi Calcium Kaisha, Ltd.): 28 parts
- Ion conductive agent (BTEAC, manufactured by Lion Corporation): 1.4 parts
- Vulcanization agent: sulfur (VULNOC®, manufactured by Ouchi Shinko Chemical Industrial Co., Ltd.): 1 part
- Vulcanization accelerator: zinc oxide: 1.5 parts
- Vulcanization accelerator: stearic acid (manufactured by NOF Corporation): 1 part The above-described materials are mixed and kneaded using a tangential pressure kneader to pass through a strainer, thereby preparing a rubber composition. The rubber composition is kneaded with an open roll and extruded from an extruder together with a support member having an adhesive layer to form a layer of the rubber composition on an outer peripheral surface of the support member, and the layer is heated at 170 in a heating furnace for 70 minutes, thereby obtaining a conductive elastic layer roll (diameter of 12 mm, conductive elastic layer having average thickness of 2 mm).

Formation of Surface Layer

- Binder resin: N-methoxymethylated nylon (trade name: FINE RESIN FR101, manufactured by Namariichi Co., Ltd.): 100 parts
- Conductive agent: carbon black (volume average particle diameter of 43 nm, trade name: MONAHRCH 1000, manufactured by Cabot Corporation): 5 parts
- Particles for forming unevenness: polyamide particles (volume average particle diameter of 5 trade name: Orgasol 2001UDNat1, manufactured by Arkema S.A.): 25 parts The above-described materials are mixed, diluted with methanol, and subjected to a dispersion treatment under conditions of a propeller rotation speed of 2,000 rpm and a dispersion time of 60 minutes using a bead mill (bead material: glass, bead diameter: 1.3 mm), thereby obtaining a composition for forming a surface layer. The elastic layer of the conductive elastic layer roll is coated with the composition for forming a surface layer by a blade coating method and heated and dried at 150° C. for 30 minutes, thereby forming a surface layer. Thereafter, the terminals of the surface layer and the conductive elastic layer are cut off to obtain a charging member.

Charging Rolls (2) to (7)

Charging rolls (2) to (7) are produced in the same manner as in the production of the charging roll (1) except that the amount of carbon black used, the amount of calcium carbonate used, and the heating conditions in the heating furnace are changed as listed in Table 1 in the formation of the elastic layer.

TABLE 1

| | Elastic layer | | | | |
|---|---|---|---|---|---|
| | Carbon black | Calcium carbonate | Vulcanization | | Storage elastic |
| Roll No. | Blending amount Parts by mass | Blending amount Parts by mass | Temperature ° C. | Time min | modulus G' MPa |
| (7) | 3 | 32 | 170 | 70 | 5.5 |
| (1) | 2 | 28 | 170 | 70 | 5.0 |
| (2) | 2 | 25 | 170 | 70 | 4.0 |
| (3) | 1 | 25 | 165 | 70 | 3.5 |
| (4) | 1 | 21 | 165 | 70 | 2.5 |
| (5) | 1 | 12 | 160 | 70 | 1.5 |
| (6) | 1 | 10 | 160 | 70 | 1.0 |

Preparation of Binder Resin for Photosensitive Layer

Polyester Resin (1)

Polyester resins (PE1) to (PE7) are prepared as the polyester resin (1). Tables 2 and 3 show units and compositions constituting the polyester resins.

Tables 2 and 3 show "constitutional unit:compositional ratio" (for example, A2-3:50). The compositional ratio is in units of % by mole of each of the dicarboxylic acid unit and the diol unit.

A2-3 and the like listed in Tables 2 and 3 are specific examples of the dicarboxylic acid unit (A) described above.

B1-4 and the like listed in Tables 2 and 3 are specific examples of the diol unit (B) described above.

Full-Aliphatic Polyester Resin

A full-aliphatic polyester resin obtained by polycondensing oxalic acid and cyclohexanedicarboxylic acid is prepared.

Polycarbonate Resin (1)

Polycarbonate resins (PC1) to (PC5) are prepared as the polycarbonate resin (1). Table 2 shows units and compositions constituting the polycarbonate resins.

Table 2 shows "constitutional unit:compositional ratio" (for example, Cb1-4:50). The compositional ratio of each constitutional unit is in units of % by mole.

Cb1-4 and the like listed in Table 2 are specific examples of the above-described constitutional unit (C).

Full-Aliphatic Polycarbonate Resin

A full-aliphatic polycarbonate resin obtained by reacting ethylene glycol with phosgene is prepared.

Production of Photoreceptor Including Lamination Type Photosensitive Layer

Photoreceptor S1

Formation of Undercoat Layer

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmφ glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer. The average thickness of the undercoat layer is 25 μm.

Formation of Charge Generation Layer

A mixture of 15 parts of hydroxygallium phthalocyanine as a charge generation material (Bragg angle (2θ±0.2°) of the X-ray diffraction spectrum using CuKα characteristic X-ray has diffraction peaks at positions at least of 7.5°, 9.9°, 12.5, 16.3°, 18.6°, 25.1°, and 28.3°), 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The undercoat layer is immersed in and coated with the coating solution for forming a charge generation layer, and dried at room temperature (25° C.±3° C.) to form a charge generation layer having an average thickness of 0.18 μm.

Formation of Charge Transport Layer 60 parts of the polyester resin (PE1) as a binder resin and 40 parts of CTM-1 as a charge transport material are dissolved in 270 parts of tetrahydrofuran and 30 parts of toluene, thereby obtaining a coating solution for forming a charge transport layer. The charge generation layer is immersed in and coated with the coating solution for forming a charge transport layer, and dried at 145° C. for 30 minutes to form a charge transport layer having an average thickness of 40 μm.

CTM-1

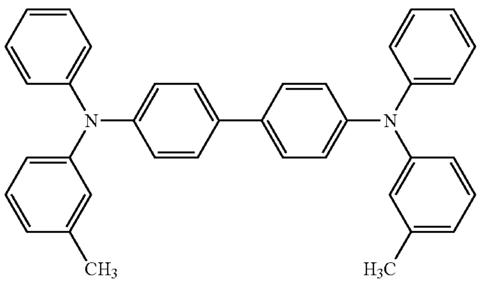

Photoreceptors S2 to S16 and Photoreceptors SC1 and SC2

Each photoreceptor is prepared in the same manner as that for the photoreceptor S1 except that the kind of the polyester resin or the polycarbonate resin and the kind and the amount of the charge transport material are changed to the specifications listed in Table 2 in the formation of the charge transport layer. The charge transport materials CTM-2 to CTM-5 are the following compounds.

CTM-2

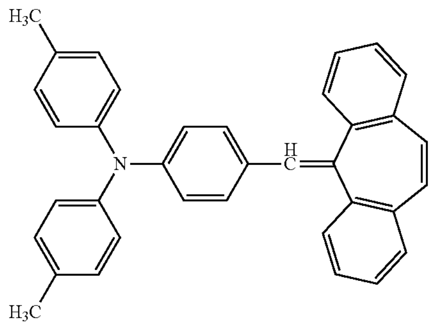

CTM-5

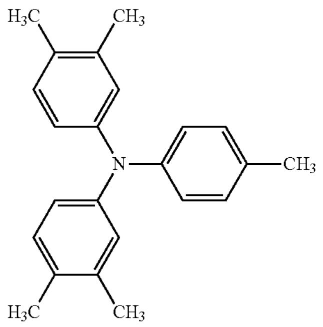

CTM-3

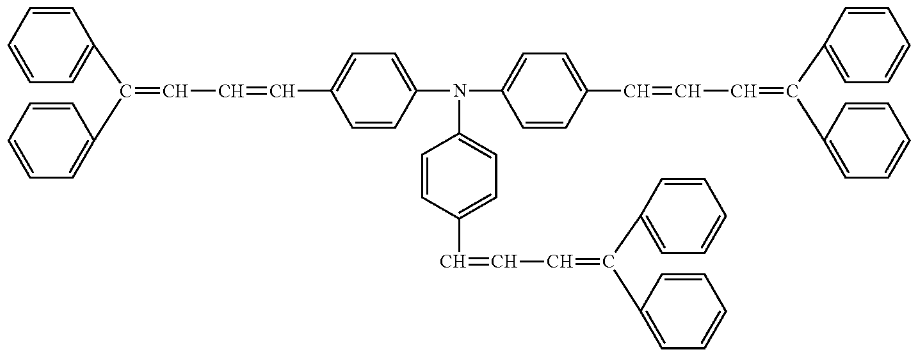

CTM-4

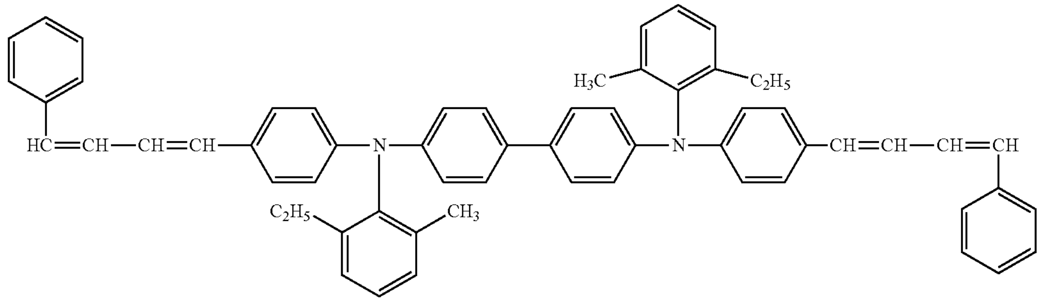

Production of Photoreceptor Including Single Layer Type Photosensitive Layer

Photoreceptor T1

Formation of Single Layer Type Photosensitive Layer 45.75 parts of the polyester resin (PE1) as a binder resin, 1.25 parts of V-type hydroxygallium phthalocyanine as a charge generation material (Bragg angle (2θ±0.2°) of the X-ray diffraction spectrum using Cukα characteristic X-ray has diffraction peaks at positions of at least 7.3°, 16.0°, 24.9°, and 28.0°), 9 parts of ETM-1 as an electron transport material, 44 parts of CTM-1 as a charge transport material, and 175 parts of tetrahydrofuran and 75 parts of toluene as solvents are mixed, and the mixture is subjected to a dispersion treatment in a sand mill for 4 hours using glass beads having a diameter of 1 mm, thereby obtaining a coating solution for forming a single layer type photosensitive layer.

An aluminum substrate having an outer diameter of 30 mm, a length of 244.5 mm, and a thickness of 1 mm is coated with the obtained coating solution for forming a photosensitive layer by a dip coating method, and dried and cured at a temperature of 110° C. for 40 minutes to form a single layer type photosensitive layer having an average thickness of 36

ETM-1

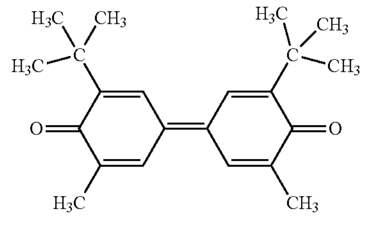

CTM-1

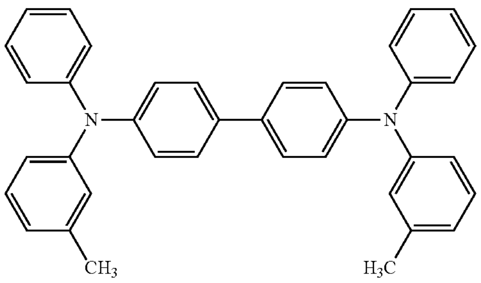

Photoreceptors T2 to T7 and Photoreceptor TC1

Each photoreceptor is prepared in the same manner as that for the photoreceptor T1 except that the kind of the polyester resin is changed to the specifications listed in Table 3 in the formation of the single layer type photosensitive layer.

Production of Image Forming Unit and Image Forming Apparatus

Examples 1 to 26 and Comparative Examples 1 to 4

"DocuCentre-VI C7771" (manufactured by FUJIFILM Business Innovation Corporation) is prepared as an image forming apparatus, and the charging member and the photoreceptor including the lamination type photosensitive layer are combined as listed in Table 2 and mounted on the image forming apparatus. The following evaluations are performed on the image forming apparatus.

Examples 27 to 38 and Comparative Examples 5 and 6

"DocuCentre-VI C7771" (manufactured by FUJIFILM Business Innovation Corporation) is prepared as an image forming apparatus, and the charging member and the photoreceptor including the single layer type photosensitive layer are combined as listed in Table 3 and mounted on the image forming apparatus. The following evaluations are performed on the image forming apparatus.

Performance Evaluation of Image Forming Apparatus

Abrasion Resistance of Photoreceptor

The photoreceptor is mounted on an electrophotographic type image forming apparatus (DocuCentre-VI C7771, manufactured by FUJIFILM Business Innovation Corporation), and a black solid image with an image density (area coverage) of 100% is formed on 100,000 sheets of A3 size plain paper in an environment of a temperature of 24° C. and a relative humidity of 55%. The average thickness of the charge transport layer (or the single layer type photosensitive layer) is acquired before and after the image formation, and a difference in the average thickness before and after the image formation is defined as the amount of abrasion (nm). A Permascope (manufactured by Fisher Instruments K.K.) is used as a film thickness measuring machine.

The amount of abrasion is classified as follows. The results are listed in Tables 2 and 3.

A: The amount of abrasion is less than 500 nm

B: The amount of abrasion is 500 nm or greater and less than 1,000 nm

C: The amount of abrasion is 1,000 nm or greater and less than 1,500 nm

D: The amount of abrasion is 1,500 nm or greater and less than 2,000 nm

E: The amount of abrasion is 2,000 nm or greater

Image Quality Defects Caused by Contamination of Charging Member

The photoreceptor is mounted on a modified machine of an electrophotographic type image forming apparatus (DocuCentre-VI C7771, manufactured by FUJIFILM Business Innovation Corporation), and a black solid image with an image density (area coverage) of 100% is formed on 1,000 sheets of A3 size plain paper in an environment of a temperature of 28° C. and a relative humidity of 85%. Thereafter, an entire surface halftone 30% black image is formed on one sheet of A3 size plain paper, and image quality defects (color streaks in the process direction) are visually evaluated.

The levels of abnormalities in image quality are classified as follows. The results are listed in Tables 2 and 3.

A: Abnormalities are not found in the image quality

B: One slight color streak is generated

C: A plurality of slight color streaks are generated

D: One severe color streak is generated

E: A plurality of severe color streaks are generated

TABLE 2

| | Charging roll | | | Charge transport layer of photoreceptor | | | | | Performance evaluation | |
|---|---|---|---|---|---|---|---|---|---|---|
| | | | | Polyester resin | | | Charge transport material | | | |
| | Roll No. | Storage elastic modulus G' MPa | Photoreceptor | Resin No. | Dicarboxylic acid unit Unit (A) mo1% | Diol unit Unit (B) mol % | Type | Addition amount mass % | Abrasion resistance of photoreceptor | Image quality defect |
| Comparative Example 1 | (3) | 3.5 | SC1 | Full-aliphatic polyester resin | | | CTM-1 | 40 | D | A |
| Comparative Example 2 | (7) | 5.5 | S1 | PE1 | A2-3:50 | B1-4:50 | CTM-1 | 40 | C | A |
| Example 1 | (1) | 5.0 | S1 | PE1 | A2-3:50 | B1-4:50 | CTM-1 | 40 | B | A |
| Example 2 | (2) | 4.0 | S1 | PE1 | A2-3:50 | B1-4:50 | CTM-1 | 40 | B | A |
| Example 3 | (3) | 3.5 | S1 | PE1 | A2-3:50 | B1-4:50 | CTM-1 | 40 | A | A |
| Example 4 | (4) | 2.5 | S1 | PE1 | A2-3:50 | B1-4:50 | CTM-1 | 40 | A | A |
| Example 5 | (5) | 1.5 | S1 | PE1 | A2-3:50 | B1-4:50 | CTM-1 | 40 | A | A |
| Example 6 | (6) | 1.0 | S1 | PE1 | A2-3:50 | B1-4:50 | CTM-1 | 40 | A | B |
| Example 7 | (3) | 3.5 | S2 | PE1 | A2-3:50 | B1-4:50 | CTM-2 | 40 | B | A |
| Example 8 | (3) | 3.5 | S3 | PE1 | A2-3:50 | B1-4:50 | CTM-3 | 40 | B | A |
| Example 9 | (3) | 3.5 | S4 | PE1 | A2-3:50 | B1-4:50 | CTM-4 | 40 | B | A |
| Example 10 | (3) | 3.5 | S5 | PE1 | A2-3:50 | B1-4:50 | CTM-5 | 40 | B | A |
| Example 11 | (3) | 3.5 | S6 | PE2 | A2-3:50 | B5-1:50 | CTM-1 | 40 | B | A |
| Example 12 | (3) | 3.5 | S7 | PE3 | A2-3:50 | B1-2:50 | CTM-1 | 40 | B | A |
| Example 13 | (3) | 3.5 | S8 | PE4 | A2-3:50 | B2-6:50 | CTM-1 | 40 | B | A |

TABLE 2-continued

| | | | | | | | | | | |
|---|---|---|---|---|---|---|---|---|---|---|
| Example 14 | (3) | 3.5 | S9 | PE5 | A3-2:50 | B1-2:50 | CTM-1 | 40 | B | A |
| Example 15 | (3) | 3.5 | S10 | PE6 | A3-2:40<br>A4-3:10 | B6-4:50 | CTM-1 | 40 | B | A |
| Example 16 | (3) | 3.5 | S11 | PE7 | A1-1:25<br>A1-7:25 | B3-3:50 | CTM-1 | 40 | B | A |

| | Charging roll | | | Charge transport layer of photoreceptor | | | | | Performance evaluation | |
|---|---|---|---|---|---|---|---|---|---|---|
| | | | | Polyester resin | | | Charge transport material | | | |
| | Roll No. | Storage elastic modulus G' MPa | Photoreceptor No. | Resin No. | Constitutional unit mol % | mol % | Type | Addition amount mass % | Abrasion resistance of photoreceptor | Image quality defect |
| Comparative Example 3 | (3) | 3.5 | SC2 | Full-aliphatic polyester resin | | | CTM-1 | 40 | E | A |
| Comparative Example 4 | (7) | 5.5 | S12 | PC1 | Ca2-3:50 | Cb1-4:50 | CTM-1 | 40 | D | A |
| Example 17 | (1) | 5.0 | S12 | PC1 | Ca2-3:50 | Cb1-4:50 | CTM-1 | 40 | B | A |
| Example 18 | (2) | 4.0 | S12 | PC1 | Ca2-3:50 | Cb1-4:50 | CTM-1 | 40 | B | A |
| Example 19 | (3) | 3.5 | S12 | PC1 | Ca2-3:50 | Cb1-4:50 | CTM-1 | 40 | A | A |
| Example 20 | (4) | 2.5 | S12 | PC1 | Ca2-3:50 | Cb1-4:50 | CTM-1 | 40 | A | A |
| Example 21 | (5) | 1.5 | S12 | PC1 | Ca2-3:50 | Cb1-4:50 | CTM-1 | 40 | A | A |
| Example 22 | (6) | 1.0 | S12 | PC1 | Ca2-3:50 | Cb1-4:50 | CTM-1 | 40 | A | B |
| Example 23 | (3) | 3.5 | S13 | PC2 | Ca2-3:50 | Cb5-1:50 | CTM-1 | 40 | B | A |
| Example 24 | (3) | 3.5 | S14 | PC3 | Ca2-3:50 | Cb1-2:50 | CTM-1 | 40 | B | A |
| Example 25 | (3) | 3.5 | S15 | PC4 | Ca2-3:50 | Cb2-6:50 | CTM-1 | 40 | B | A |
| Example 26 | (3) | 3.5 | S16 | PC5 | Ca3-2:50 | Cb1-2:50 | CTM-1 | 40 | B | A |

TABLE 3

| | Charging roll | | | Charge transport layer of photoreceptor | | | Performance evaluation | |
|---|---|---|---|---|---|---|---|---|
| | | | | Polyester resin | | | | |
| | Roll No. | Storage elastic modulus G' MPa | Photoreceptor No. | Resin No. | Dicarboxylic acid unit Unit (A) mol % | Diol unit Unit (B) mol % | Abrasion resistance of photoreceptor | Image quality defect |
| Comparative Example 5 | (3) | 3.5 | TC1 | Full-aliphatic polyester resin | | | E | A |
| Comparative Example 6 | (7) | 5.5 | T1 | PE1 | A2-3:50 | B1-4:50 | D | A |
| Example 27 | (1) | 5.0 | T1 | PE1 | A2-3:50 | B1-4:50 | B | A |
| Example 28 | (2) | 4.0 | T1 | PE1 | A2-3:50 | B1-4:50 | B | A |
| Example 29 | (3) | 3.5 | T1 | PE1 | A2-3:50 | B1-4:50 | A | A |
| Example 30 | (4) | 2.5 | T1 | PE1 | A2-3:50 | B1-4:50 | A | A |
| Example 31 | (5) | 1.5 | T1 | PE1 | A2-3:50 | B1-4:50 | A | A |
| Example 32 | (6) | 1.0 | T1 | PE1 | A2-3:50 | B1-4:50 | A | B |
| Example 33 | (3) | 3.5 | T2 | PE2 | A2-3:50 | B5-1:50 | B | A |
| Example 34 | (3) | 3.5 | T3 | PE3 | A2-3:50 | B1-2:50 | B | A |
| Example 35 | (3) | 3.5 | T4 | PE4 | A2-3:50 | B2-6:50 | B | A |
| Example 36 | (3) | 3.5 | T5 | PE5 | A3-2:50 | B1-2:50 | B | A |
| Example 37 | (3) | 3.5 | T6 | PE6 | A3-2:40<br>A4-3:10 | B6-4:50 | B | A |
| Example 38 | (3) | 3.5 | T7 | PE7 | A1-1:25<br>A1-7:25 | B3-3:50 | B | A |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming unit comprising:

a photoreceptor; and a charging member that comes into contact with a surface of the photoreceptor and charges the photoreceptor, wherein the photoreceptor includes a conductive substrate, and a lamination type photosensitive layer disposed on the conductive substrate and including a charge generation layer and a charge transport layer, the charge transport layer contains at least one of a polyester resin that has a constitutional unit having an aromatic ring or a polycarbonate resin that has a constitutional unit having an aromatic ring, the charging member includes a support member and an elastic layer disposed on the support member, and the elastic layer has a storage elastic modulus G' of 3.5 MPa or less at a frequency of 100 Hz in dynamic viscoelasticity measurement under a temperature condition of 24° C.

2. An image forming unit comprising:

a photoreceptor; and a charging member that comes into contact with a surface of the photoreceptor and charges the photoreceptor, wherein the photoreceptor includes a conductive substrate, and a single layer type photosensitive layer disposed on the conductive substrate, the single layer type photosensitive layer contains at least one of a polyester resin that has a constitutional unit having an aromatic ring or a polycarbonate resin that has a constitutional unit having an aromatic ring, the charging member includes a support member and an elastic layer disposed on the support member, and the elastic layer has a storage elastic modulus G' of 3.5 MPa or less at a frequency of 100 Hz in dynamic viscoelasticity measurement under a temperature condition of 24° C.

3. The image forming unit according to claim 1, wherein the elastic layer of the charging member has 1.0 MPa or greater of the storage elastic modulus G'.

4. The image forming unit according to claim 2, wherein the elastic layer of the charging member has 1.0 MPa or greater of the storage elastic modulus G'.

5. The image forming unit according to claim 1, wherein the elastic layer of the charging member contains an elastic material, carbon black, and calcium carbonate, and a content of the carbon black is 1 part by mass or greater and 10 parts by mass or less and a content of the calcium carbonate is 10 parts by mass or greater and 40 parts by mass or less with respect to 100 parts by mass of the elastic material.

6. The image forming unit according to claim 2, wherein the elastic layer of the charging member contains an elastic material, carbon black, and calcium carbonate, and a content of the carbon black is 1 part by mass or greater and 10 parts by mass or less and a content of the calcium carbonate is 10 parts by mass or greater and 40 parts by mass or less with respect to 100 parts by mass of the elastic material.

7. The image forming unit according to claim 3, wherein the elastic layer of the charging member contains an elastic material, carbon black, and calcium carbonate, and a content of the carbon black is 1 part by mass or greater and 10 parts by mass or less and a content of the calcium carbonate is 10 parts by mass or greater and 40 parts by mass or less with respect to 100 parts by mass of the elastic material.

8. The image forming unit according to claim 1, wherein the polyester resin that has a constitutional unit having an aromatic ring includes a polyester resin (1) having a dicarboxylic acid unit (A) represented by Formula (A) and a diol unit (B) represented by Formula (B), Formula (A)

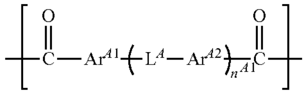

Formula (B)

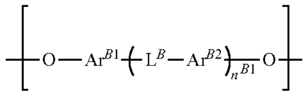

in Formula (A), $Ar^{A1}$ and $Ar^{A2}$ each independently represent an aromatic ring that may have a substituent, $L^{A}$ represents a single bond or a divalent linking group, and $n^{A1}$ represents 0, 1, or 2, in Formula (B), $Ar^{B1}$ and $Ar^{B2}$ each independently represent an aromatic ring that may have a substituent, $L^{B}$ represents a single bond, an oxygen atom, a sulfur atom, or $—C(Rb^1)(Rb^2)—$, and $n^{B1}$ represents 0, 1, or 2, where $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

9. The image forming unit according to claim 8, wherein the dicarboxylic acid unit (A) represented by Formula (A) includes at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4), Formula (A1)

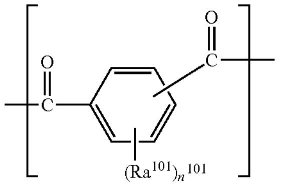

Formula (A2)

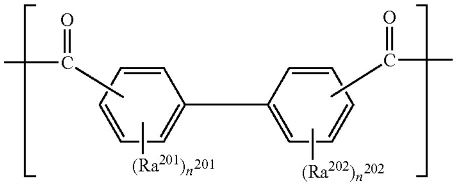

Formula (A3)

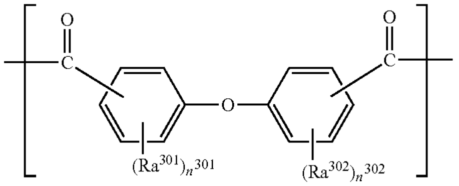

-continued

Formula (A4)

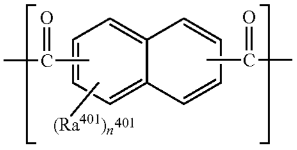

in Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

10. The image forming unit according to claim 8, wherein the diol unit (B) represented by Formula (B) includes at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8), Formula (B1)

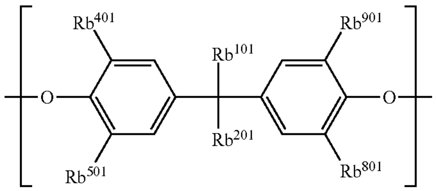

Formula (B2)

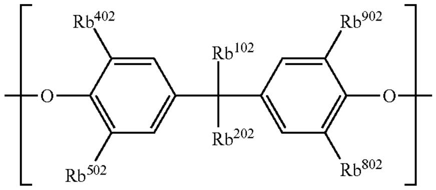

-continued

Formula (B3)

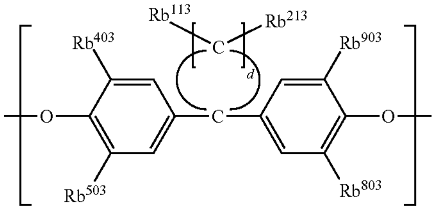

Formula (B4)

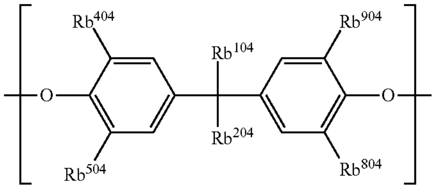

Formula (B5)

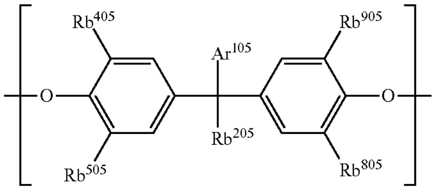

Formula (B6)

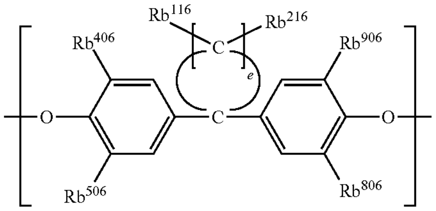

Formula (B7)

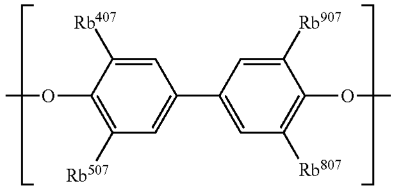

Formula (B8)

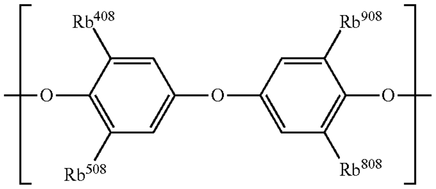

in Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom, in Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

11. The image forming unit according to claim 1, wherein the polycarbonate resin that has a constitutional unit having an aromatic ring includes a polycarbonate resin (1) having a constitutional unit (C) represented by Formula (C), Formula (C)

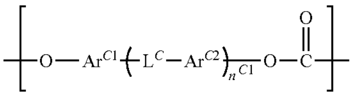

in Formula (C), $Ar^{C1}$ and $Ar^{C2}$ each independently represent an aromatic ring that may have a substituent, Le represents a single bond or a divalent linking group, and $n^{C1}$ represents 0, 1, or 2.

12. The image forming unit according to claim 11, wherein the constitutional unit (C) represented by Formula (C) includes at least one selected from the group consisting of a constitutional unit (Ca1) represented by Formula (Ca1), a constitutional unit (Ca2) represented by Formula (Ca2), a constitutional unit (Ca3) represented by Formula (Ca3), a constitutional unit (Ca4) represented by Formula (Ca4), a constitutional unit (Cb1) represented by Formula (Cb1), a constitutional unit (Cb2) represented by Formula (Cb2), a constitutional unit (Cb3) represented by Formula (Cb3), a constitutional unit (Cb4) represented by Formula (Cb4), a constitutional unit (Cb5) represented by Formula (Cb5), a constitutional unit (Cb6) represented by Formula (Cb6), a constitutional unit (Cb7) represented by Formula (Cb7), and a constitutional unit (Cb8) represented by Formula (Cb8), Formula (Ca1)

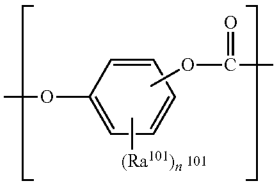

Formula (Ca2)

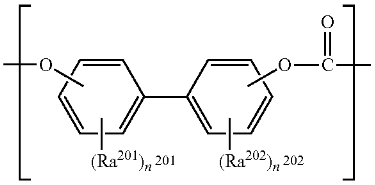

Formula (Ca3)

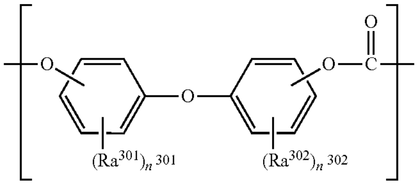

Formula (Ca4)

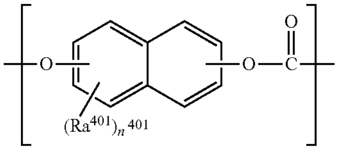

Formula (Cb1)

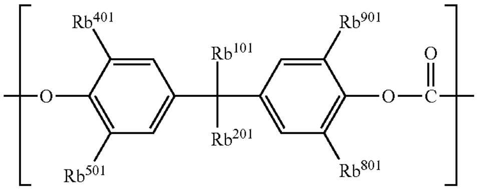

Formula (Cb2)

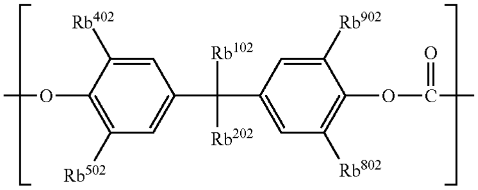

-continued

Formula (Cb3)

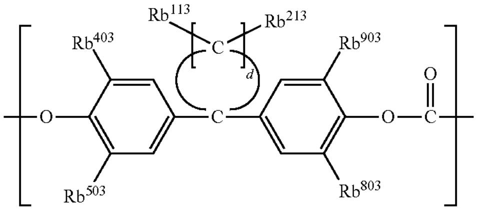

Formula (Cb4)

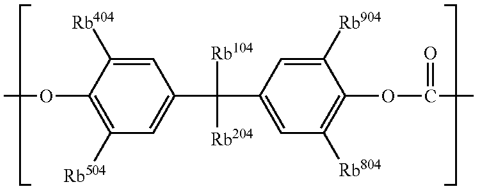

Formula (Cb5)

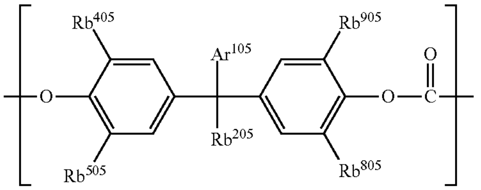

Formula (Cb6)

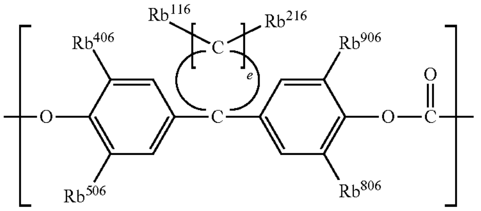

Formula (Cb7)

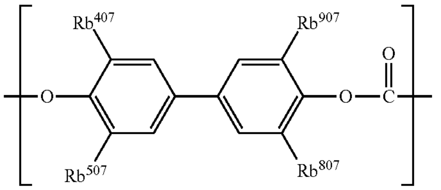

Formula (Cb8)

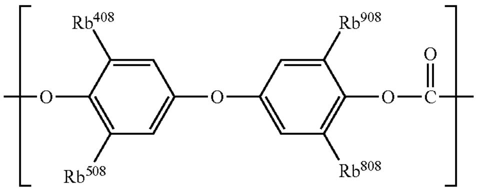

in Formula (Ca1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (Ca2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (Ca3), $n^{301}$ and $n^{302}$ each independently represent an integer of 0 or greater and 4 or less, and $n^{30}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (Ca4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (Cb1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (Cb2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (Cb3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (Cb4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (Cb5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (Cb6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (Cb7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom, in Formula (Cb8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

13. A process cartridge comprising:

the image forming unit according to claim 1, wherein the process cartridge is attachable to and detachable from an image forming apparatus.

14. An image forming apparatus comprising:

the image forming unit according to claim 1;

an electrostatic latent image forming unit that forms an electrostatic latent image on the charged surface of the photoreceptor;

a developing unit that develops the electrostatic latent image formed on the surface of the photoreceptor with a developer containing a toner to form a toner image; and a transfer unit that transfers the toner image to a surface of a recording medium.

15. The image forming unit according to claim 1, wherein the elastic layer of the charging member contains an elastic material, carbon black, and calcium carbonate, and a mass ratio of a content of carbon black to a content of calcium carbonate (carbon black:calcium carbonate) is a range of 100:500 to 100:3,000.

16. The image forming unit according to claim 2, wherein the elastic layer of the charging member contains an elastic material, carbon black, and calcium carbonate, and a mass ratio of a content of carbon black to a content of calcium carbonate (carbon black:calcium carbonate) is a range of 100:500 to 100:3,000.

17. The image forming unit according to claim 15, wherein the content of the carbon black is 2 parts by mass or less with respect to 100 parts by mass of the elastic material.

18. The image forming unit according to claim 16, wherein the content of the carbon black is 2 parts by mass or less with respect to 100 parts by mass of the elastic material.

19. The image forming unit according to claim 15, wherein the content of the calcium carbonate is 28 parts by mass or less with respect to 100 parts by mass of the elastic material.

20. The image forming unit according to claim 16, wherein the content of the calcium carbonate is 28 parts by mass or less with respect to 100 parts by mass of the elastic material.

* * * * *